United States Patent
Huennekes et al.

(10) Patent No.: US 12,330,141 B2
(45) Date of Patent: Jun. 17, 2025

(54) SELECTIVE CATALYTIC REDUCTION SUSPENSION

(71) Applicant: BASF MOBILE EMISSIONS CATALYSTS LLC, Iselin, NJ (US)

(72) Inventors: Edgar Viktor Huennekes, Hannover (DE); Petra Cordes, Hannover (DE); Jan Martin Becker, Hannover (DE); Ruediger Wolff, Nienburg/Weser (DE); Joseph A. Patchett, Iselin, NJ (US); Nicholas McGuire, Huntsville, AL (US); Edith Schneider, Nienburg/Weser (DE); Kevin Beard, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 738 days.

(21) Appl. No.: 17/594,838

(22) PCT Filed: May 5, 2020

(86) PCT No.: PCT/EP2020/062375
§ 371 (c)(1),
(2) Date: Nov. 1, 2021

(87) PCT Pub. No.: WO2020/225235
PCT Pub. Date: Nov. 12, 2020

(65) Prior Publication Data
US 2022/0288563 A1 Sep. 15, 2022

(30) Foreign Application Priority Data

May 6, 2019 (EP) .................................... 19172795

(51) Int. Cl.
*B01J 21/06* (2006.01)
*B01J 21/08* (2006.01)
(Continued)

(52) U.S. Cl.
CPC ............... *B01J 23/22* (2013.01); *B01J 21/08* (2013.01); *B01J 23/10* (2013.01); *B01J 23/30* (2013.01);
(Continued)

(58) Field of Classification Search
CPC ........ B01J 21/063; B01J 21/066; B01J 23/08; B01J 23/10; B01J 23/22; B01J 23/30;
(Continued)

(56) References Cited

U.S. PATENT DOCUMENTS 4,085,193 A * 4/1978 Nakajima .......... B01D 53/9418
502/328
5,958,829 A 9/1999 Domesle et al.
(Continued)

FOREIGN PATENT DOCUMENTS

JP 2008-155133 A 7/2008
JP 2010-531227 A 9/2010
(Continued)

OTHER PUBLICATIONS

International Search Report dated Jul. 9, 2020, PCT/EP2020/062375.

*Primary Examiner* — Cam N. Nguyen
(74) *Attorney, Agent, or Firm* — DLA Piper LLP (US)

(57) ABSTRACT

The present disclosure relates to an aqueous suspension comprising water, a source of one or more of a vanadium oxide and a tungsten oxide, and particles of an oxidic support; wherein the particles of the aqueous suspension exhibit a polymodal particle size distribution characterized by a particle size distribution curve comprising a first peak with a maximum M(I) in the range of from 0.5 micrometers to 15 micrometers and a second peak with a maximum M(II) in the range of from 1 micrometers to 40 micrometers, wherein M(I):M(II) is less than 1:1.

15 Claims, 7 Drawing Sheets

(51) Int. Cl.
  *B01J 23/10* (2006.01)
  *B01J 23/22* (2006.01)
  *B01J 23/30* (2006.01)
  *B01J 35/23* (2024.01)
  *B01J 35/50* (2024.01)
  *B01J 37/02* (2006.01)
  *B01J 37/04* (2006.01)
  *B01J 37/08* (2006.01)

(52) U.S. Cl.
  CPC .............. *B01J 35/23* (2024.01); *B01J 35/50* (2024.01); *B01J 37/0215* (2013.01); *B01J 37/04* (2013.01); *B01J 37/08* (2013.01)

(58) Field of Classification Search
  CPC ........ B01J 35/23; B01J 35/50; B01J 37/0215; B01J 37/04; B01J 37/08
  USPC ....... 502/242, 247, 248, 304, 305, 312, 349, 502/350
  See application file for complete search history.

(56) References Cited

U.S. PATENT DOCUMENTS

| | | | |
|---|---|---|---|
| 7,803,972 B2 * | 9/2010 | Guckel | B01J 35/633 |
| | | | 502/248 |
| 8,273,169 B2 * | 9/2012 | Nakano | B01J 23/687 |
| | | | 106/287.18 |
| 8,367,578 B2 | 2/2013 | Collier et al. | |
| 8,685,882 B2 * | 4/2014 | Hong | B01J 23/34 |
| | | | 423/239.1 |
| 8,702,858 B2 * | 4/2014 | Nakano | C09D 7/69 |
| | | | 502/305 |
| 9,321,034 B2 * | 4/2016 | Nakano | C09D 5/00 |
| 9,399,207 B2 | 7/2016 | Hikazudani et al. | |
| 9,446,385 B2 * | 9/2016 | Yu | B01J 35/40 |
| 9,517,449 B2 | 12/2016 | Nazarpoor et al. | |
| 10,124,320 B1 * | 11/2018 | Inokawa | B01J 23/10 |
| 10,207,253 B1 * | 2/2019 | Inokawa | B01J 23/92 |
| 10,556,230 B2 * | 2/2020 | Fukumura | B01D 53/8684 |
| 10,583,421 B2 * | 3/2020 | Harding | B01J 37/04 |
| 10,695,752 B2 | 6/2020 | Misumi et al. | |
| 11,229,901 B2 | 1/2022 | Malmberg et al. | |
| 2015/0018204 A1 | 1/2015 | Nazarpoor et al. | |

FOREIGN PATENT DOCUMENTS

| | | |
|---|---|---|
| JP | 2012-200667 A | 10/2012 |
| WO | WO 2005/047663 | 5/2005 |
| WO | 2017/146175 A1 | 8/2017 |
| WO | WO 2017/216690 | 12/2017 |
| WO | 2018/115045 A1 | 6/2018 |
| WO | 2018/224651 A2 | 12/2018 |

* cited by examiner under 35 U.S.C. § 371 of International Application No. PCT/EP2020/062375, filed on May 5, 2020, which claims the benefit of priority to European Application No. 19172795.7, filed May 6, 2019; the disclosure of each of these applications are each incorporated herein by reference in their entirety.

SELECTIVE CATALYTIC REDUCTION SUSPENSION

This application is a national stage filing under 35 U.S.C. § 371 of International Application No. PCT/EP2020/062375, filed on May 5, 2020, which claims the benefit of priority to European Application No. 19172795.7, filed May 6, 2019; the disclosure of each of these applications are each incorporated herein by reference in their entirety.

The present invention relates to an aqueous suspension, a process for preparing said aqueous suspension and a process for preparing a selective catalytic reduction catalyst using said aqueous suspension. The present invention further relates to a selective catalyst reduction catalyst obtained or obtainable by the aforementioned process.

Selective catalytic reduction (SCR) catalysts having vanadium and tungsten supported on an oxidic material, such as titania, are well-known. The typical process for producing these titania particles in the catalysts involving precipitation is centered on small particles having an average particle size in the range of 1 to 3 micrometers. However, it became apparent that with such SCR catalysts, there were some problems of washcoat adhesion. US 2015/0005158 A1 discusses the optimization of washcoat adhesion of hydrocarbon conversion catalyst on metallic substrates. This document highlights the difficulty of adhesion in general for SCR catalysts (both zeolite based SCR catalysts and $TiO_2$ based SCR catalysts). Thus, there was still a need to provide improved suspension and improved process for preparing a selective catalytic reduction catalyst, using said suspension, in order to improve the washcoat adhesion on a substrate while maintaining or improving the catalytic activities of the selective catalytic reduction catalyst.

Therefore, it was an object of the present invention to provide an aqueous suspension and a process using said suspension for preparing a selective catalytic reduction catalyst which exhibits improved washcoat adhesion on a substrate while it maintains or improves the catalytic activities of the selective catalytic reduction catalyst.

Surprisingly, it was found that the use of an aqueous suspension according to the present invention in a process for preparing a selective catalytic reduction catalyst permits to improve the washcoat adhesion on a substrate while maintaining or improving the catalytic activities of the selective catalytic reduction catalyst.

Therefore, the present invention relates to an aqueous suspension comprising water, a source of one or more of a vanadium oxide and a tungsten oxide, and particles of an oxidic support; wherein the particles of the aqueous suspension exhibit a polymodal particle size distribution characterized by a particle size distribution curve determined according to Reference Example 1 herein, said particle size distribution curve comprising a first peak with a maximum M(I) in the range of from 0.5 to 15 micrometers and a second peak with a maximum M(II) in the range of from 1 to 40 micrometers, wherein $(M(I)/\mu m):(M(II)/\mu m)<1:1$.

It is preferred that the particles of the aqueous suspension exhibit a bi-modal particle size distribution.

Indeed, it was found that by introducing a polymodal particle size distribution in an aqueous suspension for preparing a selective catalytic reduction catalyst the washcoat adhesion was improved as well as the catalytic activities of the obtained catalyst.

In the context of the present invention, it is preferred that the aqueous suspension further comprises particles of a mixed oxide comprising cerium.

As to the mixed oxide, it is preferred that the weight ratio of the mixed oxide relative to the oxidic support is in the range of from 1:1 to 1:10, more preferably in the range of from 1:1.5 to 1:8, more preferably in the range of from 1:2 to 1:7, more preferably in the range of from 1:2.5 to 1:5.

As to the mixed oxide, it is preferred that it additionally comprises one or more of zirconium, niobium, molybdenum, lanthanum, yttrium, neodymium, praseodymium and hafnium, more preferably one or more of zirconium, lanthanum, praseodymium, yttrium, and hafnium, more preferably one or more of zirconium, praseodymium, lanthanum and hafnium. It is more preferred that the mixed oxide additionally comprises zirconium, praseodymium, lanthanum and hafnium. It is more preferred that from 20 to 60 weight-%, more preferably from 30 to 50 weight-%, more preferably from 35 to 45 weight-%, of the mixed oxide consist of cerium, calculated as $CeO_2$, and that from 40 to 80 weight-%, more preferably from 50 to 70 weight-%, more preferably from 55 to 65 weight-%, of the mixed oxide consist of zirconium, praseodymium, lanthanum and hafnium, calculated respectively as $ZrO_2$, $Pr_6O_{11}$, $La_2O_3$ and $HfO_2$. It is more preferred that from 30 to 60 weight-%, more preferably from 40 to 55 weight-%, more preferably from 45 to 55 weight-% of the mixed oxide consist of zirconium, calculated as $ZrO_2$.

It is preferred that from 95 to 100 weight-%, more preferably from 98 to 100 weight-%, more preferably from 99 to 100 weight-%, more preferably from 99.5 to 100 weight-%, of the mixed oxide consist of cerium, oxygen, zirconium, praseodymium, lanthanum and hafnium.

It is preferred that the aqueous suspension comprises the mixed oxide at an amount in the range from 10 to 50 weight-%, more preferably from 20 to 45 weight-%, more preferably from 25 to 40 weight-%, more preferably from 25 to 35 weight-%, based on the weight of the oxidic support.

As to the particles of the mixed oxide comprising cerium, it is preferred that they exhibit a monomodal particle size distribution or a polymodal particle size distribution, more preferably a polymodal particle size distribution, more preferably a bi-modal particle size distribution, characterized by a particle size distribution curve determined according to Reference Example 1 herein.

In the context of the present invention, it is preferred that $(M(II)/\mu m)-(M(I)/\mu m) \geq 0.5$, more preferably that $0.5 \leq (M(II)/\mu m)-(M(I)/\mu m) \leq 20$, more preferably that $1.5 \leq (M(II)/\mu m)-(M(I)/\mu m) \leq 15$.

Therefore, the present invention preferably relates to a suspension comprising water, a source of one or more of a vanadium oxide and a tungsten oxide, and particles of an oxidic support; wherein the particles of the aqueous suspension exhibit a polymodal particle size distribution characterized by a particle size distribution curve determined according to Reference Example 1 herein, said particle size distribution curve comprising a first peak with a maximum M(I) in the range of from 0.5 to 15 micrometers and a second peak with a maximum M(II) in the range of from 1 to 40 micrometers, wherein $(M(I)/\mu m):(M(II)/\mu m)<1:1$, and wherein $(M(II)/\mu m)-(M(I)/\mu m) \geq 0.5$, more preferably $0.5 \leq (M(II)/\mu m)-(M(I)/\mu m) \leq 20$, more preferably $1.5 \leq (M(II)/\mu m)-(M(I)/\mu m) \leq 15$.

Alternatively, the present invention preferably relates to a suspension comprising water, a source of one or more of a vanadium oxide and a tungsten oxide, particles of a mixed oxide comprising cerium and particles of an oxidic support; wherein the particles of the aqueous suspension exhibit a polymodal particle size distribution characterized by a particle size distribution curve determined according to Reference Example 1 herein, said particle size distribution curve comprising a first peak with a maximum M(I) in the range of from 0.5 to 15 micrometers and a second peak with a maximum M(II) in the range of from 1 to 40 micrometers, wherein (M(I)/μm):(M(II)/μm)<1:1, and wherein (M(II)/μm)−(M(I)/μm)≥0.5, more preferably 0.5≤(M(II)/μm)−(M(I)/μm)≤20, more preferably 1.5≤(M(II)/μm)−(M(I)/μm)≤15. According to said alternative, it is more preferred that 3≤(M(II)/μm)−(M(I)/μm)≤12, more preferably 4≤(M(II)/μm)−(M(I)/μm)≤10.

In the context of the present invention, it is preferred that M(I) is in the range of from 0.5 to 5 micrometers, more preferably in the range of from 0.7 to 4 micrometers, more preferably in the range of from 0.8 to 3.5 micrometers, more preferably in the range of from 0.9 to 3 micrometers, more preferably in the range of from 1 to 2.5 micrometers, more preferably in the range of from 1.25 to 2 micrometers.

It is preferred that M(II) is in the range of from 5.5 to 40 micrometers, more preferably in the range of from 6 to 20 micrometers, more preferably in the range of from 6.25 to 15 micrometers, more preferably in the range of from 6.5 to 10 micrometers, more preferably in the range of from 6.75 to 9 micrometers. It is more preferred that the relationship between M(I) and M(II) and their respective value are as defined in the foregoing.

As to M(I) and M(II), when the aqueous suspension does not comprise the mixed oxide, it is preferred that M(I) is in the range of from 0.5 to 5 micrometers, more preferably in the range of from 0.7 to 4 micrometers, more preferably in the range of from 0.8 to 3.5 micrometers, more preferably in the range of from 0.9 to 3 micrometers, more preferably in the range of from 1 to 2.5 micrometers, more preferably in the range of from 1.25 to 2 micrometers and that M(II) is in the range of from 5.5 to 40 micrometers, more preferably in the range of from 6 to 20 micrometers, more preferably in the range of from 6.25 to 15 micrometers, more preferably in the range of from 8 to 15 micrometers, more preferably in the range of from 10 to 15 micrometers.

As to M(I) and M(II), when the aqueous suspension does comprise the mixed oxide, it is preferred that M(I) is in the range of from 0.5 to 5 micrometers, more preferably in the range of from 0.7 to 4 micrometers, more preferably in the range of from 0.8 to 3.5 micrometers, more preferably in the range of from 0.9 to 3 micrometers, more preferably in the range of from 1 to 2.5 micrometers, more preferably in the range of from 1.25 to 2 micrometers and that M(II) is in the range of from 5.5 to 40 micrometers, more preferably in the range of from 6 to 20 micrometers, more preferably in the range of from 6.25 to 15 micrometers, more preferably in the range of from 6.5 to 10 micrometers, more preferably in the range of from 6.75 to 9 micrometers.

As to the particles of the aqueous suspension, it is preferred that they have a Dv10 in the range of from 0.01 to 3 micrometers, preferably in the range of from 0.1 to 2.5 micrometers, more preferably in the range of from 0.25 to 2 micrometers, more preferably in the range of from 0.4 to 1.5 micrometers. When the aqueous suspension does not comprise the particles of the mixed oxide comprising cerium, it is preferred that the particles of the aqueous suspension have a Dv10 in the range of from 0.01 to 3 micrometers, more preferably in the range of from 0.1 to 2.5 micrometers, more preferably in the range of from 0.25 to 2 micrometers, more preferably in the range of from 0.4 to 1.5 micrometers, more preferably in the range of from 0.4 to 0.75 micrometers, the Dv10 being determined according to Reference Example 1 herein. When the aqueous suspension does comprise the particles of a mixed oxide comprising cerium, it is preferred that the particles of the aqueous suspension have a Dv10 in the range of from 0.01 to 3 micrometers, more preferably in the range of from 0.1 to 2.5 micrometers, more preferably in the range of from 0.25 to 2 micrometers, more preferably in the range of from 0.4 to 1.5 micrometers, the Dv10 being determined according to Reference Example 1 herein. It is more preferred that the particles of the aqueous suspension have a Dv10 in the range of from 0.5 to 1.25 micrometers, more preferably in the range of from 0.6 to 0.75 micrometer, the Dv10 being determined according to Reference Example 1 herein.

In the context of the present invention, it is preferred that the particles of the aqueous suspension have a Dv50 in the range of from 0.2 to 10 micrometers, more preferably in the range of from 0.5 to 7 micrometers, more preferably in the range of from 0.75 to 4 micrometers, more preferably in the range of from 0.9 to 3 micrometers, more preferably in the range of from 1 to 2.5 micrometers, the Dv50 being determined according to Reference Example 1 herein.

In the context of the present invention, it is preferred that the particles of the aqueous suspension have a Dv90 in the range of from 1 to 30 micrometers, more preferably in the range of from 1.5 to 20 micrometers, more preferably in the range of from 1.75 to 10 micrometers, more preferably in the range of from 2 to 5 micrometers, more preferably in the range of from 2 to 4 micrometers, the Dv90 being determined according to Reference Example 1 herein.

It is preferred that the aqueous suspension has a solid content in the range of from 10 to 60 weight-%, more preferably in the range of from 20 to 55 weight-%, more preferably in the range of from 30 to 50 weight-%, more preferably in the range of from 35 to 45 weight-%, based on the weight of the aqueous suspension.

It is preferred that the suspension has a pH in the range of from 2 to 12, more preferably in the range of from 3 to 10, more preferably in the range of from 4 to 9, more preferably in the range of from 5 to 8, more preferably in the range of from 6 to 7.5.

It is preferred that the suspension has a viscosity in the range of from 20 to 200 mPa*s, more preferably in the range of from 50 to 100 mPa*s, measured at 300 rotations per second.

It is preferred that the aqueous suspension comprises a source of a vanadium oxide, wherein the source of a vanadium oxide more preferably is selected from the group consisting of a vanadium oxalate solution, an ammonium metavanadate, and a mixture of two or more thereof, more preferably a vanadium oxalate solution.

It is preferred that the aqueous suspension comprises a source of a vanadium oxide at an amount, calculated as $V_2O_5$, in the range of from 1.5 to 8 weight-%, more preferably in the range of from 2 to 7 weight-%, more preferably in the range of from 3 to 6 weight-%, based on the weight of the oxidic support.

It is preferred that the particles of the oxidic support exhibit a polymodal particle size distribution characterized by a particle size distribution curve determined according to Reference Example 1 herein. Alternatively, it is preferred that the particles of the oxidic support exhibit a monomodal particle size distribution characterized by a particle size distribution curve determined according to Reference Example 1 herein.

When the aqueous suspension does not comprise the particles of the mixed oxide comprising cerium, it is preferred that the particles of the oxidic support exhibit a polymodal particle size distribution, more preferably a bimodal particle size distribution, characterized by a particle size distribution curve determined according to Reference Example 1 herein. When the aqueous suspension does comprise the particles of the mixed oxide comprising cerium, it is preferred that the particles of the oxidic support exhibit a monomodal particle size distribution characterized by a particle size distribution curve determined according to Reference Example 1 herein.

It is preferred that the oxidic support comprises one or more of titanium, silicon, zirconium, and tungsten, more preferably one or more of titanium, silicon and zirconium, more preferably one or more of titanium, silicon and tungsten, more preferably titania. It is more preferred that the oxidic support comprises titania and one or more of tungsten and silicon.

It is more preferred that the oxidic support comprises tungsten in addition to titania. Alternatively, it is more preferred that the oxidic support comprises tungsten and silicon in addition to titania.

It is preferred that from 95 to 100 weight-%, more preferably from 98 to 100 weight-%, more preferably from 99 to 100 weight-%, more preferably from 99.5 to 100 weight-% of the oxidic support consist of titania, and more preferably one or more of tungsten and silicon, more preferably tungsten or more preferably tungsten and silicon.

It is more preferred that from 70 to 99 weight-%, more preferably from 75 to 95 weight-%, more preferably from 80 to 90 weight-%, more preferably from 85 to 90 weight-%, of the oxidic support consist of titania. When the oxidic support comprises titania, tungsten and silicon, it is preferred that from 0.5 to 15 weight-%, more preferably from 3 to 15 weight-%, more preferably from 6 to 12 weight-%, of the oxidic support consist of tungsten, calculated as $WO_3$, and that from 0.5 to 15 weight-%, more preferably from 2 to 10 weight-%, more preferably from 4 to 8 weight-%, of the oxidic support consist silicon, calculated as $SiO_2$.

It is preferred that from 40 to 90 weight-%, more preferably from 50 to 85 weight-%, more preferably from 55 to 80 weight-%, of the aqueous suspension consist of water.

It is preferred that the aqueous suspension further comprises an acid, more preferably an organic acid. It is more preferred that the organic acid is selected from the group consisting of acetic acid, tartaric acid, formic acid, lactic acid, oxalic acid and mixture of two or more thereof, more preferably selected from the group consisting of acetic acid, tartaric acid, formic acid, oxalic acid and mixture of two or more thereof, more preferably selected from the group consisting of acetic acid, tartaric acid, and mixture of two or more thereof. It is more preferred that the organic acid is tartaric acid. It is noted that the acid may be used as a rheological modifier. It is more preferred that the acid is used as a rheological modifier.

It is preferred that the aqueous suspension further comprises one or more dispersants, wherein the dispersant more preferably is an organic polymer, wherein the organic polymer more preferably is an acrylic polymer.

It is preferred that the aqueous suspension further comprises a source of an oxidic binder, wherein the oxidic binder more preferably is selected from the group consisting of alumina, silica, zirconia, and mixture of two or more thereof, more preferably selected from the group consisting of alumina, silica and mixture of two or more thereof, more preferably silica. It is more preferred that the source of an oxidic binder is colloidal silica.

It is preferred that from 0 to 0.1 weight-%, more preferably from 0 to 0.01 weight-%, more preferably from 0 to 0.001 weight-%, of the aqueous suspension consist of a zeolitic material, more preferably of a molecular sieve. In the context of the present invention, it is to be understood that it is preferred that the aqueous suspension is substantially free, more preferably free, of a zeolitic material, more preferably a molecular sieve.

It is preferred that from 0 to 0.01 weight-%, more preferably from 0 to 0.001 weight-%, more preferably from 0 to 0.0001 weight-%, of the aqueous suspension consist of copper, more preferably of copper and iron. In the context of the present invention, it is to be understood that it is preferred that the aqueous suspension is substantially free, more preferably free, of copper and iron.

It is preferred that from 0 to 0.01 weight-%, more preferably from 0 to 0.001 weight-%, more preferably from 0 to 0.0001 weight-%, more preferably from 0 to 0.00001 weight-%, of the aqueous suspension consist of platinum, preferably of platinum and palladium, more preferably of platinum, palladium and rhodium, more preferably of platinum group metals. In the context of the present invention, it is to be understood that it is preferred that the aqueous suspension is substantially free, more preferably free, of platinum, more preferably of platinum and palladium, more preferably of platinum, palladium and rhodium. It is more preferred that the aqueous suspension is substantially free, more preferably free, of platinum group metals.

It is preferred that from 98 to 100 weight-%, more preferably from 99 to 100 weight-%, more preferably from 99.5 to 100 weight-%, of the aqueous suspension consist of water, a source of one or more of a vanadium oxide and a tungsten oxide, particles of an oxidic support, and preferably one or more of an acid as defined in the foregoing, a dispersant as defined in the foregoing and a source of an oxidic binder as defined in the foregoing. It is more preferred that the aqueous suspension consists of water, a source of one or more of a vanadium oxide and a tungsten oxide, particles of an oxidic support, and more preferably one or more of an acid as defined in the foregoing, a dispersant as defined in the foregoing and a source of an oxidic binder as defined in the foregoing.

Alternatively, it is preferred that from 98 to 100 weight-%, more preferably from 99 to 100 weight-%, more preferably from 99.5 to 100 weight-%, of the aqueous suspension consist of water, a source of one or more of a vanadium oxide and a tungsten oxide, particles of an oxidic support, particles of a mixed oxide comprising cerium as defined in the foregoing, and more preferably one or more of an acid as defined in the foregoing, a dispersant as defined in the foregoing and a source of an oxidic binder as defined in the foregoing, more preferably an acid as defined in the foregoing, a dispersant as defined in the foregoing and a source of an oxidic binder as defined in the foregoing. It is more preferred that the aqueous suspension consists of water, a source of one or more of a vanadium oxide and a tungsten oxide, particles of an oxidic support, particles of a mixed oxide comprising cerium as defined in the foregoing, and more preferably one or more of an acid as defined in the foregoing, a dispersant as defined in the foregoing and a source of an oxidic binder as defined in the foregoing, more preferably an acid as defined in the foregoing, a dispersant as defined in the foregoing and a source of an oxidic binder as defined in the foregoing.

The present invention further relates to a process for preparing the aqueous suspension according to the present invention, said process comprising
(i) optionally preparing an aqueous suspension comprising water and particles of a mixed oxide comprising cerium, said mixed oxide preferably being the mixed oxide as defined in the foregoing, wherein the particles of the mixed oxide comprised in said aqueous suspension exhibit a monomodal particle size distribution; or optionally preparing an aqueous suspension comprising water and particles of a mixed oxide comprising cerium, said mixed oxide preferably being the mixed oxide as defined in in the foregoing, wherein the particles of the mixed oxide comprised in said aqueous suspension exhibit a polymodal particle size distribution, more preferably a bi-modal particle size distribution, characterized by a particle size distribution curve determined according to Reference Example 1 herein, said particle size distribution curve comprising a first peak with a maximum M1 in the range of from 0.5 to 20 micrometers and a second peak with a maximum M2 in the range of from 1 to 50 micrometers, wherein $(M1/\mu m):(M2/\mu m)<1:1$;

(ii) preparing an aqueous suspension comprising water, a source of one or more of a vanadium oxide and a tungsten oxide, said source of one or more of a vanadium oxide and a tungsten oxide preferably being the source of one or more of a vanadium oxide and a tungsten oxide as defined in the foregoing, and further comprising particles of an oxidic support, wherein the particles of the oxidic support comprised in said aqueous suspension exhibit a monomodal particle size distribution, characterized by a particle size distribution curve determined according to Reference Example 1 herein, said particle size distribution curve comprising a peak with a maximum in the range of from 0.5 to 5 micrometers, preferably in the range of from 0.7 to 4 micrometers, more preferably in the range of from 0.8 to 3.5 micrometers, more preferably in the range of from 0.9 to 3 micrometers, more preferably in the range of from 1 to 2.5 micrometers, more preferably in the range of from 1.25 to 2 micrometers, or wherein the particles of the oxidic support comprised in said aqueous suspension exhibit a polymodal particle size distribution, more preferably a bi-modal particle size distribution, characterized by a particle size distribution curve determined according to Reference Example 1 herein;

(iii) mixing the suspension obtained from (ii), optionally with the suspension obtained from (i), obtaining an aqueous suspension comprising water, a source of one or more of a vanadium oxide and a tungsten oxide, particles of an oxidic support, and optionally particles of a mixed oxide comprising cerium, wherein the particles of the aqueous suspension exhibit a polymodal particle size distribution, characterized by a particle size distribution curve determined according to Reference Example 1 herein, said particle size distribution curve comprising a first peak with a maximum M(I) in the range of from 0.5 to 15 micrometers and a second peak with a maximum M(II) in the range of from 1 to 40 micrometers, wherein $(M(I)/\mu m):(M(II)/\mu m)<1:1$.

(i)

It is preferred that the process of the present invention comprises (i) preparing an aqueous suspension comprising water and particles of a mixed oxide comprising cerium, said mixed oxide more preferably being the mixed oxide as defined in the foregoing, wherein the particles of the mixed oxide comprised in said aqueous suspension exhibit a monomodal particle size distribution; or preparing an aqueous suspension comprising water and particles of a mixed oxide comprising cerium, said mixed oxide more preferably being the mixed oxide as defined in in the foregoing, wherein the particles of the mixed oxide comprised in said aqueous suspension exhibit a polymodal particle size distribution, more preferably a bi-modal particle size distribution, characterized by a particle size distribution curve determined according to Reference Example 1 herein, said particle size distribution curve comprising a first peak with a maximum M1 in the range of from 0.5 to 20 micrometers and a second peak with a maximum M2 in the range of from 1 to 50 micrometers, wherein $(M1/\mu m):(M2/\mu m)<1:1$;

(ii) preparing an aqueous suspension comprising water, a source of one or more of a vanadium oxide and a tungsten oxide, said source of one or more of a vanadium oxide and a tungsten oxide preferably being the source of one or more of a vanadium oxide and a tungsten oxide as defined in the foregoing, and further comprising particles of an oxidic support, wherein the particles of the oxidic support comprised in said aqueous suspension exhibit a monomodal particle size distribution, characterized by a particle size distribution curve determined according to Reference Example 1 herein, said particle size distribution curve comprising a peak with a maximum in the range of from 0.5 to 5 micrometers, preferably in the range of from 0.7 to 4 micrometers, more preferably in the range of from 0.8 to 3.5 micrometers, more preferably in the range of from 0.9 to 3 micrometers, more preferably in the range of from 1 to 2.5 micrometers, more preferably in the range of from 1.25 to 2 micrometers, or wherein the particles of the oxidic support comprised in said aqueous suspension exhibit a polymodal particle size distribution, more preferably a bi-modal particle size distribution, characterized by a particle size distribution curve determined according to Reference Example 1 herein;

(iii) mixing the suspension obtained from (ii) with the suspension obtained from (i), obtaining an aqueous suspension comprising water, a source of one or more of a vanadium oxide and a tungsten oxide, particles of an oxidic support, and particles of a mixed oxide comprising cerium, wherein the particles of the aqueous suspension exhibit a polymodal particle size distribution, characterized by a particle size distribution curve determined according to Reference Example 1 herein, said particle size distribution curve comprising a first peak with a maximum M(I) in the range of from 0.5 to 15 micrometers and a second peak with a maximum M(II) in the range of from 1 to 40 micrometers, wherein $(M(I)/\mu m):(M(II)/\mu m)<1:1$.

It is preferred that the suspension obtained in (i) has a solid content in the range of from 20 to 50 weight-%, more preferably in the range of from 25 to 45 weight-%, more preferably in the range of from 30 to 40 weight-%, based on the weight of said suspension.

As to (i), it is preferred that it further comprises adding an acid, the acid more preferably being the acid as defined in the foregoing.

It is preferred that $(M2/\mu m)-(M1/\mu m) \geq 0.5$, more preferably that $0.5 \leq (M2/\mu m)-(M1/\mu m) \leq 30$, more preferably that $5 \leq (M2/\mu m)-(M1/\mu m) \leq 25$, more preferably that $10 \leq (M2/\mu m)-(M1/\mu m) \leq 23$. It is more preferred that $13 \leq (M2/\mu m)-(M1/\mu m) \leq 19$.

It is preferred that the particle size distribution of the particles of the aqueous suspension obtained according to (i) is characterized by a particle size distribution curve determined according to Reference Example 1 herein, said particle size distribution curve comprising a first peak with a maximum M1 in the range of from 0.5 to 8 micrometers and a second peak with a maximum M2 in the range of from 9 to 50 micrometers.

It is preferred that, according to (i), M1 is in the range of from 1.25 to 6 micrometers, more preferably in the range of from 1.75 to 4 micrometers, more preferably in the range of from 1.85 to 3 micrometers; and that, according to (i), M2 is in the range of from 9 to 35 micrometers, more preferably in the range of from 10 to 25 micrometers, more preferably 12 to 25 micrometers.

It is preferred that the particles of the suspension obtained according to (i) have a Dv10 in the range of from 0.2 to 8 micrometers, more preferably in the range of from 0.45 to 5 micrometers, more preferably in the range of from 0.5 to 4 micrometers, more preferably in the range of from 0.6 to 2.5 micrometers, more preferably in the range of from 0.8 to 1.25 micrometers, the Dv10 being determined according to Reference Example 1 herein.

It is preferred that the particles of the suspension obtained according to (i) have a Dv50 in the range of from 1 to 25 micrometers, more preferably in the range of from 1.5 to 10 micrometers, more preferably in the range of from 1.75 to 7 micrometers, more preferably in the range of from 2 to 4 micrometers, the Dv50 being determined according to Reference Example 1 herein.

It is preferred that the particles of the suspension obtained according to (i) have a Dv90 in the range of from 3 to 30 micrometers, more preferably in the range of from 6 to 25 micrometers, more preferably in the range of from 8 to 20 micrometers, more preferably in the range of from 10 to 18 micrometers, more preferably in the range of from 12 to 16 micrometers, the Dv90 being determined according to Reference Example 1 herein.

It is preferred that preparing the aqueous suspension according to (i) comprises (i.1') providing particles of the mixed oxide comprising cerium, wherein the particles of the mixed oxide exhibit a monomodal particle size distribution characterized by a particle size distribution curve determined according to Reference Example 1 herein, said particle size distribution curve comprising a peak with a maximum in the range of from 5.5 to 40 micrometers, more preferably in the range of from 6 to 20 micrometers, more preferably in the range of from 6.25 to 15 micrometers, more preferably in the range of from 6.5 to 10 micrometers, more preferably in the range of from 6.75 to 9 micrometers;

(i.2') preparing an aqueous suspension comprising suspending the particles provided in (i.1') in water. Alternatively, it is preferred that preparing the aqueous suspension according to (i) comprises (i.1) providing particles of the mixed oxide comprising cerium, wherein the particles of the mixed oxide exhibit a polymodal particle size distribution, more preferably a bi-modal particle size distribution, characterized by a particle size distribution curve determined according to Reference Example 1 herein, said particle size distribution curve comprising a first peak with a maximum M1' in the range of from 0.5 to 30 micrometers and a second peak with a maximum M2' in the range of from 1 to 60 micrometers, wherein (M1'/μm):(M2'/μm)<1:1;

(i.2) preparing an aqueous suspension comprising suspending the particles provided in (i.1) in water;

(i.3) optionally milling the aqueous suspension prepared in (i.2) until the particles of the aqueous suspension exhibit a polymodal particle size distribution, more preferably a bi-modal particle size distribution, characterized by a particle size distribution curve comprising a first peak with a maximum M1 and a second peak with a maximum M2, wherein (M1/μm):(M2/μm)<1:1 and wherein (M2/μm)<(M2'/μm) and/or (M1/μm)<(M1'/μm).

As to (i), it is preferred that (M2'/μm)−(M1'/μm)≥0.5, more preferably that 0.5≤(M2'/μm)(M1'/μm)≤30, more preferably that 5≤(M2'/μm)−(M1'/μm)≤25, more preferably that 10≤(M2'/μm)−(M1'/μm)≤23, more preferably that 15≤(M2'/μm)−(M1'/μm)≤20.

It is preferred that the particle size distribution of the particles of the mixed oxide provided in (i.1) is characterized by a particle size distribution curve determined according to Reference Example 1 herein, said particle size distribution curve comprising a first peak with a maximum M1' in the range of from 0.5 to 7 micrometers and a second peak with a maximum M2' in the range of from 8 to 60 micrometers, the process comprising the milling according to (i.3).

It is preferred that the first peak of the particle size distribution curve of the particles of the mixed oxide provided in (i.1) has a maximum M1' in the range of from 1 to 5 micrometers, more preferably in the range of from 1.5 to 4 micrometers, more preferably in the range of from 1.75 to 3 micrometers.

It is preferred that the second peak of the particle size distribution curve of the particles of the mixed oxide provided in (i.1) has a maximum M2' in the range of from 10 to 40 micrometers, more preferably in the range of from 12 to 30 micrometers, more preferably 15 to 25 micrometers, the particle size distribution being determined according to Reference Example 1 herein.

It is preferred that the particles of the mixed oxide provided in (i.1) have a Dv10 in the range of from 0.2 to 10 micrometers, more preferably in the range of from 0.5 to 7 micrometers, more preferably in the range of from 0.6 to 4 micrometers, more preferably in the range of from 0.75 to 3 micrometers, more preferably in the range of from 0.9 to 1.75 micrometers, the Dv10 being determined according to Reference Example 1 herein.

It is preferred that the particles of the mixed oxide provided in (i.1) have a Dv50 in the range of from 1 to 30 micrometers, more preferably in the range of from 1.5 to 20 micrometers, more preferably in the range of from 1.75 to 10 micrometers, more preferably in the range of from 2 to 5 micrometers, the Dv50 being determined according to Reference Example 1 herein.

It is preferred that the particles of the mixed oxide provided in (i.1) have a Dv90 in the range of from 5 to 45 micrometers, more preferably in the range of from 8 to 40 micrometers, more preferably in the range of from 12 to 30 micrometers, more preferably in the range of from 15 to 25 micrometers, the Dv90 being determined according to Reference Example 1 herein. It is more preferred that the particles of the mixed oxide provided in (i.1) have a Dv90 in the range of from 17 to 24 micrometers, the Dv90 being determined according to Reference Example 1 herein.

(ii)

In the context of the present invention, as to (ii), it is preferred that the suspension obtained in (ii) has a solid content in the range of from 25 to 55 weight-%, more preferably in the range of from 30 to 50 weight-%, more preferably in the range of from 35 to 45 weight-%, based on the weight of said suspension.

It is preferred that (ii) further comprises adding a dispersant, the dispersant preferably being as defined in the foregoing.

It is preferred that the particles of the oxidic support in the suspension obtained according to (ii) have a Dv10 in the range of from 0.3 to 4 micrometers, more preferably in the range of from 0.4 to 3 micrometers, more preferably in the range of from 0.5 to 2 micrometers, more preferably in the range of from 0.55 to 1 micrometer, more preferably in the range of from 0.6 to 0.8 micrometer, the Dv10 being determined according to Reference Example 1 herein.

It is preferred that the particles of the oxidic support in the suspension obtained according to (ii) have a Dv50 in the range of from 0.5 to 5 micrometers, more preferably in the range of from 0.6 to 4 micrometers, more preferably in the range of from 0.7 to 2 micrometers, more preferably in the range of from 0.8 to 1.5 micrometers, the Dv50 being determined according to Reference Example 1 herein.

It is preferred that the particles of the oxidic support in the suspension according to (ii) have a Dv90 in the range of from 0.5 to 6 micrometers, more preferably in the range of from 1 to 4 micrometers, more preferably in the range of from 1.5 to 3.5 micrometers, the Dv90 being determined according to Reference Example 1 herein. It is more preferred that the particles of the oxidic support in the suspension obtained according to (ii) have a Dv90 in the range of from 2 to 3 micrometers, the Dv90 being determined according to Reference Example 1 herein.

When the aqueous suspension obtained in (iii) does not comprise the particles of the mixed oxide comprising cerium, it is preferred that in the suspension according to (ii) the particles of the oxidic support exhibit a polymodal particle size distribution, more preferably a bi-modal particle size distribution, characterized by a particle size distribution curve determined according to Reference Example 1 herein. When the aqueous suspension obtained in (iii) does comprise the particles of the mixed oxide comprising cerium, it is preferred that the particles of the oxidic support exhibit a monomodal particle size distribution characterized by a particle size distribution curve determined according to Reference Example 1 herein.

(iii)

It is preferred that the suspension obtained in (iii) has a solid content in the range of from 25 to 55 weight-%, more preferably in the range of from 30 to 50 weight-%, more preferably in the range of from 35 to 45 weight-%, based on the weight of said suspension.

It is preferred that (iii) further comprises measuring the pH of the aqueous phase of the suspension and adjusting the pH to a value in the range of from 4 to 9, more preferably in the range of from 5 to 8, more preferably in the range of from 6 to 7.

It is preferred that (iii) further comprises adding a source of an oxidic binder, the source of the oxidic binder more preferably being the source of the oxidic binder as defined in in the foregoing.

It is preferred that, after adding the source of the oxidic binder, the suspension in (iii) has a solid content in the range of from 25 to 55 weight-%, more preferably in the range of from 30 to 50 weight-%, more preferably in the range of from 35 to 45 weight-%, based on the weight of said suspension.

It is preferred that (iii), after adding the source of the oxidic binder, comprises measuring the pH of the aqueous phase of the obtained suspension and adjusting the pH to a value in the range of from 4 to 9, more preferably in the range of from 5 to 8, more preferably in the range of from 6.5 to 7.5.

It is preferred that the process consists of (ii) and (iii), more preferably of (i), (ii) and (iii).

The present invention further relates to a process for preparing a selective catalytic reduction catalyst, the process comprising
  (a) preparing an aqueous suspension according to the present invention, preferably according to a process according to the present invention;
  (b) disposing the suspension obtained in (a) on the surface of the internal walls of a substrate comprising an inlet end, an outlet end, a substrate axial length extending between the inlet end and the outlet end, and a plurality of passages defined by internal walls of the substrate extending therethrough, wherein the interface between the passages and the internal walls is defined by the surface of the internal walls; and optionally drying the substrate comprising the suspension disposed thereon;
  (c) calcining the substrate obtained in (b).

It is preferred that disposing the suspension according to (b) is performed by spraying the suspension onto the substrate or by immersing the substrate into the suspension, more preferably by immersing the substrate into the suspension.

It is preferred that the aqueous suspension obtained in (a) is disposed according to (b) over x % of the substrate axial length from the inlet end to the outlet end of the substrate, or from the outlet end to the inlet end of the substrate, wherein x is in the range of from 80 to 100, more preferably in the range of from 90 to 100, more preferably in the range of from 95 to 100, more preferably in the range of from 98 to 100.

It is preferred that the substrate in (b) is a flow-through substrate, more preferably one or more of a cordierite flow-through substrate and a silicon carbide flow-through substrate, more preferably a cordierite flow-through substrate. Alternatively, it is preferred that the substrate in (b) is a wall-flow substrate, more preferably one or more of a cordierite wall-flow substrate and a silicon carbide wall-flow substrate, more preferably a cordierite wall-flow substrate. It is also conceivable that the substrate is a metallic substrate. It is more preferred that the substrate in (b) is a flow-through substrate, more preferably a cordierite flow-through substrate. It is more preferred that the internal walls of the flow-through substrate in (b) have an uncoated average porosity in the range of from 15 to 80%, more preferably in the range of from 25 to 75%, more preferably in the range of from 30 to 60%, wherein the average porosity is determined according to Reference Example 4.

It is preferred that drying in (b) is performed in a gas atmosphere having a temperature in the range of from 60 to 180° C., more preferably in the range of from 90 to 150° C., the gas atmosphere more preferably comprising oxygen, the gas atmosphere more preferably being air.

It is preferred that drying in (b) is performed for a duration in the range of from 5 minutes to 3 hours, more preferably in the range of from 10 minutes to 2 hours, more preferably in the range of from 20 minutes to 1 hour.

As to (b), it is preferred that disposing comprises
  (b.1) disposing a first portion of the aqueous suspension obtained in (a) on the surface of the internal walls of a substrate comprising an inlet end, an outlet end, a substrate axial length extending between the inlet end and the outlet end, and a plurality of passages defined by internal walls of the substrate extending therethrough, wherein the interface between the passages and the internal walls is defined by the surface of the internal walls; and drying the substrate comprising the first portion of the suspension disposed thereon;

(b.2) disposing a second portion of the aqueous suspension obtained in (a) on the substrate comprising the first portion of the suspension disposed thereon obtained in (b.1), and optionally drying the substrate comprising the first and the second portions of the suspension disposed thereon.

It is preferred that the first portion of the aqueous suspension obtained in (a) is disposed according to (b.1) over x1% of the substrate axial length from the inlet end to the outlet end of the substrate, or from the outlet end to the inlet end of the substrate, wherein x1 is in the range of from 80 to 100, more preferably in the range of from 90 to 100, more preferably in the range of from 95 to 100, more preferably in the range of from 98 to 100.

It is preferred that the second portion of the aqueous suspension obtained in (a) is disposed according to (b.2) over x2% of the substrate axial length from the inlet end to the outlet end of the substrate or from the outlet end to the inlet end of the substrate, wherein x2 is in the range of from 80 to 100, more preferably in the range of from 90 to 100, more preferably in the range of from 95 to 100, more preferably in the range of from 98 to 100.

It is preferred that the first portion of the aqueous suspension obtained in (a) is disposed according to (b.1) over x1% of the substrate axial length from the inlet end to the outlet end of the substrate and the second portion of the aqueous suspension obtained in (a) is disposed according to (b.2) over x2% of the substrate axial length from the outlet end to the inlet end of the substrate.

It is preferred that drying according to (b.1) is performed in a gas atmosphere having a temperature in the range of from 60 to 180° C., more preferably in the range of from 90 to 150° C., the gas atmosphere more preferably comprising oxygen, the gas atmosphere more preferably being air.

It is preferred that drying according to (b.1) is performed for a duration in the range of from 5 minutes to 3 hours, more preferably in the range of from 10 minutes to 2 hours, more preferably in the range of from 20 minutes to 1 hour.

As to (b.1), it is preferred that it further comprises, after drying, calcining which is performed in a gas atmosphere having a temperature in the range of from 300 to 600° C., more preferably in the range of from 350 to 550° C., more preferably in the range of from 400 to 500° C., the gas atmosphere more preferably comprising oxygen, the gas atmosphere more preferably being air.

As to (b.1), it is preferred that it further comprises, after drying, calcining which is performed in a gas atmosphere for a duration in the range of from 0.5 to 8 hours, more preferably in the range of from 1 to 6 hours, more preferably in the range of from 3 to 5 hours, the gas atmosphere more preferably comprising oxygen, the gas atmosphere more preferably being air.

It is preferred that drying according to (b.2) is performed in a gas atmosphere having a temperature in the range of from 60 to 180° C., more preferably in the range of from 90 to 150° C., the gas atmosphere more preferably comprising oxygen, the gas atmosphere more preferably being air.

It is preferred that drying according to (b.2) is performed for a duration in the range of from 5 minutes to 3 hours, more preferably in the range of from 10 minutes to 2 hours, more preferably in the range of from 20 minutes to 1 hour.

It is preferred that calcining according to (c) is performed in a gas atmosphere having a temperature in the range of from 300 to 600° C., more preferably in the range of from 350 to 550° C., more preferably in the range of from 400 to 500° C., the gas atmosphere more preferably comprising oxygen, the gas atmosphere more preferably being air.

It is preferred that calcining according to (c) is performed in a gas atmosphere for a duration in the range of from 0.5 to 8 hours, more preferably in the range of from 1 to 6 hours, more preferably in the range of from 3 to 5 hours, the gas atmosphere more preferably comprising oxygen, the gas atmosphere more preferably being air.

The present invention further relates to a selective catalytic reduction catalyst, preferably obtained or obtainable by a process according to the present invention, the catalyst comprising:

a substrate comprising an inlet end, an outlet end, a substrate axial length extending between the inlet end and the outlet end, and a plurality of passages defined by internal walls of the substrate extending therethrough, wherein the interface between the passages and the internal walls is defined by the surface of the internal walls;

a coating disposed on the surface of the internal walls of the substrate, the coating comprising one or more of a vanadium oxide and a tungsten oxide supported on an oxidic support, and preferably a mixed oxide comprising cerium.

It is preferred that the coating comprises a vanadium oxide supported on the oxidic support, wherein the vanadium oxide is one or more of a vanadium (V) oxide, a vanadium (IV) oxide and a vanadium (III) oxide.

It is preferred that the coating comprises the vanadium oxide at an amount in the range of from 1.5 to 10 weight-%, more preferably in the range of from 2.5 to 8 weight-%, more preferably in the range of from 3 to 5 weight-%, based on the weight of the oxidic support.

It is preferred that the oxidic support comprises one or more of titanium, silicon, zirconium and tungsten, preferably one or more of titanium, silicon and tungsten, more preferably the oxidic support comprises titania. It is more preferred that the oxidic support comprises titania, and one or more of tungsten and silicon, more preferably tungsten or more preferably tungsten and silicon.

It is preferred that from 95 to 100 weight-%, more preferably from 98 to 100 weight-%, more preferably from 99 to 100 weight-%, more preferably from 99.5 to 100 weight-%, of the oxidic support consist of titania, and more preferably one or more of tungsten and silicon, more preferably tungsten or more preferably tungsten and silicon.

It is preferred that from 70 to 99 weight-%, more preferably from 75 to 95 weight-%, more preferably from 80 to 90 weight-%, more preferably from 85 to 90 weight-%, of the oxidic support consist of titania. It is more preferred that from 0.5 to 15 weight-%, more preferably from 3 to 15 weight-%, more preferably from 6 to 12 weight-%, of the oxidic support consist of tungsten, calculated as $WO_3$ and that from 0.5 to 15 weight-%, more preferably from 2 to 10 weight-%, more preferably from 4 to 8 weight-%, of the oxidic support consist silicon, calculated as $SiO_2$.

It is preferred that the coating comprises the oxidic support at a loading in the catalyst in the range of from 1.5 to 10 g/in$^3$, more preferably in the range of from 2 to 7 g/in$^3$, more preferably in the range of from 2.5 to 5 g/in$^3$, more preferably in the range of from 2.5 to 4.2 g/in$^3$.

It is preferred that the coating of the catalyst comprises the mixed oxide comprising cerium, wherein the mixed oxide additionally comprises one or more of zirconium, niobium, molybdenum, lanthanum, yttrium, neodymium, praseodymium and hafnium, more preferably one or more of zirconium, lanthanum, praseodymium, yttrium, and hafnium, more preferably one or more of zirconium, praseodymium, lanthanum and hafnium. It is more preferred that the mixed oxide additionally comprises zirconium, praseodymium, lanthanum and hafnium.

It is preferred that from 20 to 60 weight-%, more preferably from 30 to 50 weight-%, more preferably from 35 to 45 weight-%, of the mixed oxide consist of cerium, calculated as $CeO_2$, and that from 40 to 80 weight-%, more preferably from 50 to 70 weight-%, more preferably from 55 to 65 weight-%, of the mixed oxide consist of zirconium, praseodymium, lanthanum and hafnium, calculated respectively as $ZrO_2$, $Pr_6O_{11}$, $La_2O_3$ and $HfO_2$, wherein more preferably from 30 to 60 weight-%, more preferably from 40 to 55 weight-%, more preferably from 45 to 55 weight-% of the mixed oxide consist of zirconium, calculated as $ZrO_2$.

It is preferred that from 95 to 100 weight-%, more preferably from 98 to 100 weight-%, more preferably from 99 to 100 weight-%, more preferably from 99.5 to 100 weight-%, of the mixed oxide consist of cerium, oxygen, zirconium, praseodymium, lanthanum and hafnium.

It is preferred that the coating comprises the mixed oxide at a loading in the catalyst in the range of from 0.4 to 2.5 g/in³, more preferably in the range of from 0.6 to 2 g/in³, more preferably in the range of from 0.7 to 1.5 g/in³.

It is preferred that the coating comprises the mixed oxide at a loading I1, (I1), and the oxidic support at a loading I2, (I2), wherein the loading ratio of the mixed oxide relative to the oxidic support, (I1):(I2), is in the range of from 1:1 to 1:10, more preferably in the range of from 1:1.5 to 1:8, more preferably in the range of from 1:2 to 1:7, more preferably in the range of from 1:2.5 to 1:5.

It is preferred that the coating further comprises an oxidic binder, wherein the oxidic binder more preferably is selected from the group consisting of alumina, silica, zirconia, and mixture of two or more thereof, more preferably selected from the group consisting of alumina, silica and mixture of two or more thereof, more preferably silica. It is more preferred that the coating comprises the mixed oxide at a loading I1, (I1), and the oxidic binder at a loading I3, (I3), wherein the loading ratio of the mixed oxide to the oxidic binder, (I1):(I3), is in the range of from 3.5:1 to 15:1, more preferably in the range of from 4:1 to 10:1, more preferably in the range of from 5:1 to 8:1.

It is preferred that the coating comprises the oxidic binder at a loading in the catalyst in the range of from 0.05 to 0.5 g/in³, more preferably in the range of from 0.07 to 0.3 g/in³, more preferably in the range of from 0.08 to 0.25 g/in³.

It is preferred that the catalyst comprises the coating at a loading in the range of from 2.5 to 12 g/in³, more preferably in the range of from 3 to 8 g/in³, more preferably in the range of from 3.5 to 6 g/in³, more preferably in the range of from 4 to 5.5 g/in³.

It is preferred that from 0 to 0.1 weight-%, more preferably from 0 to 0.01 weight-%, more preferably from 0 to 0.001 weight-%, of the coating consist of a zeolitic material, more preferably of a molecular sieve. In the context of the present invention, it is to be understood that it is preferred that the coating is substantially free, more preferably free, of a zeolitic material, more preferably of a molecular sieve.

It is preferred that from 0 to 0.01 weight-%, more preferably from 0 to 0.001 weight-%, more preferably from 0 to 0.0001 weight-%, more preferably from 0.00001 weight-%, of the coating consist of copper, more preferably of copper and iron. In the context of the present invention, it is to be understood that it is preferred that the coating is substantially free, more preferably free, of copper, more preferably of copper and iron.

It is preferred that from 0 to 0.01 weight-%, more preferably from 0 to 0.001 weight-%, more preferably from 0 to 0.0001 weight-%, more preferably from 0.00001 weight-%, of the coating consist of platinum, more preferably of platinum and palladium, more preferably of platinum, palladium and rhodium, more preferably of platinum group metals. In the context of the present invention, it is to be understood that it is preferred that the coating is substantially free, more preferably free, of platinum, more preferably of platinum and palladium, more preferably of platinum, palladium and rhodium. It is more preferred that the coating is substantially free, more preferably free, of platinum group metals.

It is preferred that from 95 to 100 weight, more preferably from 98 to 100 weight-%, more preferably from 99 to 100 weight-%, more preferably from 99.5 to 100 weight-%, of the coating consist of one or more of a vanadium oxide and a tungsten oxide supported on an oxidic support, and more preferably a mixed oxide comprising cerium, and more preferably an oxidic binder as defined in the foregoing.

It is preferred that the coating extends over x % of the substrate axial length on the surface of the internal walls from the inlet end to the outlet end or from the outlet end to the inlet end, x being in the range of from 90 to 100, more preferably in the range of from 95 to 100, more preferably in the range of from 98 to 100.

It is preferred that the substrate is a flow-through substrate, more preferably one or more of a cordierite flow-through substrate and a silicon carbide flow-through substrate, more preferably a cordierite flow-through substrate. Alternatively, it is preferred that the substrate is a wall-flow substrate, more preferably one or more of a cordierite wall-flow substrate and a silicon carbide wall-flow substrate, more preferably a cordierite wall-flow substrate. It is also conceivable that the substrate is a metallic substrate. It is more preferred that the substrate is a flow-through substrate, more preferably a cordierite flow-through substrate.

It is preferred that the catalyst of the present invention consists of the substrate and the coating.

The present invention further relates to a use of a selective catalytic reduction catalyst according to the present invention for the selective catalytic reduction of nitrogen oxides.

The present invention further relates to a use of an aqueous suspension according to the present invention for preparing a catalyst, more preferably a selective catalytic reduction catalyst.

The present invention further relates to a method for the selective catalytic reduction of nitrogen oxides, the method comprises
    (1) providing an exhaust gas stream from a diesel engine comprising NOx;
    (2) passing the exhaust gas stream provided in (1) through the selective catalyst reduction catalyst according to the present invention.

The present invention further relates to a method for improving the adhesion of a catalytic coating to a substrate in a catalyst, the method comprising using an aqueous suspension according to the present invention for preparing the catalyst. It is preferred that the catalyst is a selective catalytic reduction catalyst.

The present invention is further illustrated by the following set of embodiments and combinations of embodiments resulting from the dependencies and back-references as indicated. In particular, it is noted that in each instance where a range of embodiments is mentioned, for example in the context of a term such as "The aqueous suspension of any one of embodiments 1 to 3", every embodiment in this range is meant to be explicitly disclosed for the skilled person, i.e. the wording of this term is to be understood by the skilled person as being synonymous to "The aqueous suspension of any one of embodiments 1, 2 and 3". Further, it is explicitly noted that the following set of embodiments is not the set of claims determining the extent of protection, but represents a suitably structured part of the description directed to general and preferred aspects of the present invention.

1. An aqueous suspension comprising water, a source of one or more of a vanadium oxide and a tungsten oxide, and particles of an oxidic support;
   wherein the particles of the aqueous suspension exhibit a polymodal particle size distribution characterized by a particle size distribution curve determined according to Reference Example 1 herein, said particle size distribution curve comprising a first peak with a maximum M(I) in the range of from 0.5 to 15 micrometers and a second peak with a maximum M(II) in the range of from 1 to 40 micrometers, wherein $(M(I)/\mu m):(M(II)/\mu m)<1:1$.

2. The suspension of embodiment 1, wherein the particles of the aqueous suspension exhibit a bi-modal particle size distribution.

3. The suspension of embodiment 1 or 2, further comprising particles of a mixed oxide comprising cerium.

4. The suspension of embodiment 3, wherein the mixed oxide additionally comprises one or more of zirconium, niobium, molybdenum, lanthanum, yttrium, neodymium, praseodymium and hafnium, preferably one or more of zirconium, lanthanum, praseodymium, yttrium, and hafnium, more preferably one or more of zirconium, praseodymium, lanthanum and hafnium, wherein the mixed oxide more preferably additionally comprises zirconium, praseodymium, lanthanum and hafnium;
   wherein more preferably from 20 to 60 weight-%, more preferably from 30 to 50 weight-%, more preferably from 35 to 45 weight-%, of the mixed oxide consist of cerium, calculated as $CeO_2$, and wherein more preferably from 40 to 80 weight-%, more preferably from 50 to 70 weight-%, more preferably from 55 to 65 weight-%, of the mixed oxide consist of zirconium, praseodymium, lanthanum and hafnium, calculated respectively as $ZrO_2$, $Pr_6O_{11}$, $La_2O_3$ and $HfO_2$, wherein more preferably from 30 to 60 weight-%, more preferably from 40 to 55 weight-%, more preferably from 45 to 55 weight-% of the mixed oxide consist of zirconium, calculated as $ZrO_2$;
   wherein more preferably from 95 to 100 weight-%, more preferably from 98 to 100 weight-%, more preferably from 99 to 100 weight-%, more preferably from 99.5 to 100 weight-%, of the mixed oxide consist of cerium, oxygen, zirconium, praseodymium, lanthanum and hafnium.

5. The suspension of embodiment 3 or 4, wherein the aqueous suspension comprises the mixed oxide at an amount in the range from 10 to 50 weight-%, preferably from 20 to 45 weight-%, more preferably from 25 to 40 weight-%, more preferably from 25 to 35 weight-%, based on the weight of the oxidic support.

6. The suspension of any one of embodiments 3 to 5, wherein the particles of the mixed oxide exhibit a monomodal particle size distribution or a polymodal particle size distribution, preferably a polymodal particle size distribution, more preferably a bi-modal particle size distribution, characterized by a particle size distribution curve determined according to Reference Example 1 herein.

7. The suspension of any one of embodiments 1 to 6, wherein $(M(II)/\mu m)-(M(I)/\mu m) \geq 0.5$, preferably $0.5 \leq (M(II)/\mu m)-(M(I)/\mu m) \leq 20$, more preferably $1.5 \leq (M(II)/\mu m)-(M(I)/\mu m) \leq 15$, more preferably $3 \leq (M(II)/\mu m)-(M(I)/\mu m) \leq 12$, more preferably $4 \leq (M(II)/\mu m)(M(I)/\mu m) \leq 10$.

8. The suspension of any one of embodiments 1 to 7, wherein M(I) is in the range of from 0.5 to 5 micrometers, preferably in the range of from 0.7 to 4 micrometers, more preferably in the range of from 0.8 to 3.5 micrometers, more preferably in the range of from 0.9 to 3 micrometers, more preferably in the range of from 1 to 2.5 micrometers, more preferably in the range of from 1.25 to 2 micrometers;
   wherein M(II) is in the range of from 5.5 to 40 micrometers, preferably in the range of from 6 to 20 micrometers, more preferably in the range of from 6.25 to 15 micrometers, more preferably in the range of from 6.5 to 10 micrometers, more preferably in the range of from 6.75 to 9 micrometers.

9. The suspension of any one of embodiments 1 to 8, wherein the particles of the aqueous suspension have a Dv10 in the range of from 0.01 to 3 micrometers, preferably in the range of from 0.1 to 2.5 micrometers, more preferably in the range of from 0.25 to 2 micrometers, more preferably in the range of from 0.4 to 1.5 micrometers, more preferably in the range of from 0.5 to 1.25 micrometers, the Dv10 being determined according to Reference Example 1 herein.

10. The suspension of any one of embodiments 1 to 9, wherein the particles of the aqueous suspension have a Dv50 in the range of from 0.2 to 10 micrometers, preferably in the range of from 0.5 to 7 micrometers, more preferably in the range of from 0.75 to 4 micrometers, more preferably in the range of from 0.9 to 3 micrometers, more preferably in the range of from 1 to 2.5 micrometers, the Dv50 being determined according to Reference Example 1 herein.

11. The suspension of any one of embodiments 1 to 10, wherein the particles of the aqueous suspension have a Dv90 in the range of from 1 to 30 micrometers, preferably in the range of from 1.5 to 20 micrometers, more preferably in the range of from 1.75 to 10 micrometers, more preferably in the range of from 2 to 5 micrometers, more preferably in the range of from 2 to 4 micrometers, the Dv90 being determined according to Reference Example 1 herein.

12. The suspension of any one of embodiments 1 to 11, having a solid content in the range of from 10 to 60 weight-%, preferably in the range of from 20 to 55 weight-%, more preferably in the range of from 30 to 50 weight-%, more preferably in the range of from 35 to 45 weight-%, based on the weight of the aqueous suspension.

13. The suspension of any one of embodiments 1 to 12, having a pH in the range of from 2 to 12, preferably in the range of from 3 to 10, more preferably in the range of from 4 to 9, more preferably in the range of from 5 to 8, more preferably in the range of from 6 to 7.5.

14. The suspension of any one of embodiments 1 to 13, having a viscosity in the range of from 20 to 200 mPa*s, preferably in the range of from 50 to 100 mPa*s, measured at 300 rotations per second.

15. The suspension of any one of embodiments 1 to 14, wherein the aqueous suspension comprises a source of a vanadium oxide, wherein the source of a vanadium oxide preferably is selected from the group consisting of a vanadium oxalate solution, an ammonium metavanadate, and a mixture of two or more thereof, more preferably a vanadium oxalate solution.

16. The suspension of any one of embodiments 1 to 15, wherein the aqueous suspension comprises a source of a vanadium oxide at an amount, calculated as $V_2O_5$, in the range of from 1.5 to 8 weight-%, preferably in the range of from 2 to 7 weight-%, more preferably in the range of from 3 to 6 weight-%, based on the weight of the oxidic support.

17. The suspension of any one of embodiments 1 to 16, wherein the particles of the oxidic support exhibit a monomodal particle size distribution characterized by a particle size distribution curve determined according to Reference Example 1 herein; or wherein the particles of the oxidic support exhibit a polymodal particle size distribution, preferably a bi-modal particle size distribution, characterized by a particle size distribution curve determined according to Reference Example 1 herein.

18. The suspension of any one of embodiments 1 to 17, wherein the oxidic support comprises one or more of titanium, silicon, zirconium, and tungsten, preferably one or more of titanium, silicon and zirconium, more preferably one or more of titanium, silicon and tungsten, more preferably titania, and more preferably one or more of tungsten and silicon, more preferably tungsten or more preferably tungsten and silicon.

19. The suspension of embodiment 18, wherein from 95 to 100 weight-%, preferably from 98 to 100 weight-%, more preferably from 99 to 100 weight-%, more preferably from 99.5 to 100 weight-% of the oxidic support consist of titania, and preferably one or more of tungsten and silicon, more preferably tungsten or more preferably tungsten and silicon.

20. The suspension of embodiment 19, wherein from 70 to 99 weight-%, preferably from 75 to 95 weight-%, more preferably from 80 to 90 weight-%, more preferably from 85 to 90 weight-%, of the oxidic support consist of titania;
wherein from 0.5 to 15 weight-%, preferably from 3 to 15 weight-%, more preferably from 6 to 12 weight-%, of the oxidic support consist of tungsten, calculated as $WO_3$;
wherein from 0.5 to 15 weight-%, preferably from 2 to 10 weight-%, more preferably from 4 to 8 weight-%, of the oxidic support consist silicon, calculated as $SiO_2$.

21. The suspension of any one of embodiments 1 to 20, wherein from 40 to 90 weight-%, preferably from 50 to 85 weight-%, more preferably from 55 to 80 weight-%, of the aqueous suspension consist of water.

22. The suspension of any one of embodiments 1 to 21, wherein the aqueous suspension further comprises an acid, preferably an organic acid, wherein the organic acid preferably is selected from the group consisting of acetic acid, tartaric acid, formic acid, lactic acid, oxalic acid and mixture of two or more thereof, more preferably selected from the group consisting of acetic acid, tartaric acid, formic acid, oxalic acid and mixture of two or more thereof, more preferably selected from the group consisting of acetic acid, tartaric acid, and mixture of two or more thereof, more preferably the organic acid is tartaric acid.

23. The suspension of any one of embodiments 1 to 22, wherein the aqueous suspension further comprises one or more dispersants, wherein the dispersant preferably is an organic polymer, wherein the organic polymer preferably is an acrylic polymer.

24. The suspension of any one of embodiments 1 to 23, wherein the aqueous suspension further comprises a source of an oxidic binder, wherein the oxidic binder preferably is selected from the group consisting of alumina, silica, zirconia, and mixture of two or more thereof, more preferably selected from the group consisting of alumina, silica and mixture of two or more thereof, more preferably silica, wherein the source of an oxidic binder more preferably is colloidal silica.

25. The suspension of any one of embodiments 1 to 24, wherein from 0 to 0.1 weight-%, preferably from 0 to 0.01 weight-%, more preferably from 0 to 0.001 weight-%, of the aqueous suspension consist of a zeolitic material, preferably of a molecular sieve.

26. The suspension of any one of embodiments 1 to 25, wherein preferably from 0 to 0.01 weight-%, more preferably from 0 to 0.001 weight-%, more preferably from 0 to 0.0001 weight-%, of the aqueous suspension consist of copper, preferably of copper and iron.

27. The suspension of any one of embodiments 1 to 26, wherein from 0 to 0.01 weight-%, preferably from 0 to 0.001 weight-%, more preferably from 0 to 0.0001 weight-%, more preferably from 0 to 0.00001 weight-%, of the aqueous suspension consist of platinum, preferably of platinum and palladium, more preferably of platinum, palladium and rhodium, more preferably of platinum group metals.

28. The suspension of embodiment 1 or 2, wherein from 98 to 100 weight-%, preferably from 99 to 100 weight-%, more preferably from 99.5 to 100 weight-%, of the aqueous suspension consist of water, a source of one or more of a vanadium oxide and a tungsten oxide, particles of an oxidic support, and preferably one or more of an acid as defined in embodiment 22, a dispersant as defined in embodiment 23 and a source of an oxidic binder as defined in embodiment 24;
wherein the aqueous suspension more preferably consists of water, a source of one or more of a vanadium oxide and a tungsten oxide, particles of an oxidic support, and more preferably one or more of an acid as defined in embodiment 22, a dispersant as defined in embodiment 23 and a source of an oxidic binder as defined in embodiment 24.

29. The suspension of any one of embodiments 1 to 27, wherein from 98 to 100 weight-%, preferably from 99 to 100 weight-%, more preferably from 99.5 to 100 weight-%, of the aqueous suspension consist of water, a source of one or more of a vanadium oxide and a tungsten oxide, particles of an oxidic support, particles of a mixed oxide comprising cerium as defined in any one of embodiments 3 to 6, and preferably one or more of an acid as defined in embodiment 22, a dispersant as defined in embodiment 23 and a source of an oxidic binder as defined in embodiment 24, more preferably an acid as defined in embodiment 22, a dispersant as defined in embodiment 23 and a source of an oxidic binder as defined in embodiment 24;
wherein the aqueous suspension more preferably consists of water, a source of one or more of a vanadium oxide and a tungsten oxide, particles of an oxidic support, particles of a mixed oxide comprising cerium as defined in any one of embodiments 3 to 6, and more preferably one or more of an acid as defined in embodiment 22, a dispersant as defined in embodiment 23 and a source of an oxidic binder as defined in embodiment 24, more preferably an acid as defined in embodiment 22, a dispersant as defined in embodiment 23 and a source of an oxidic binder as defined in embodiment 24.

30. A process for preparing the aqueous suspension according to any one of embodiments 1 to 29, said process comprising
(i) optionally preparing an aqueous suspension comprising water and particles of a mixed oxide comprising cerium, said mixed oxide preferably being the mixed oxide as defined in any one of embodiments 4 to 6, wherein the particles of the mixed oxide comprised in said aqueous suspension exhibit a monomodal particle size distribution; or optionally preparing an aqueous suspension comprising water and particles of a mixed oxide comprising cerium, said mixed oxide preferably being the mixed oxide as defined in any one of embodiments 4 to 6, wherein the particles of the mixed oxide comprised in said aqueous suspension exhibit a polymodal particle size distribution, preferably a bi-modal particle size distribution, characterized by a particle size distribution curve determined according to Reference Example 1 herein, said particle size distribution curve comprising a first peak with a maximum M1 in the range of from 0.5 to 20 micrometers and a second peak with a maximum M2 in the range of from 1 to 50 micrometers, wherein (M1/µm):(M2/µm)<1:1;

(ii) preparing an aqueous suspension comprising water, a source of one or more of a vanadium oxide and a tungsten oxide, said source of one or more of a vanadium oxide and a tungsten oxide preferably being the source of one or more of a vanadium oxide and a tungsten oxide as defined in embodiment 15, and further comprising particles of an oxidic support, wherein the particles of the oxidic support comprised in said aqueous suspension exhibit a monomodal particle size distribution, characterized by a particle size distribution curve determined according to Reference Example 1 herein, said particle size distribution curve comprising a peak with a maximum in the range of from 0.5 to 5 micrometers, preferably in the range of from 0.7 to 4 micrometers, more preferably in the range of from 0.8 to 3.5 micrometers, more preferably in the range of from 0.9 to 3 micrometers, more preferably in the range of from 1 to 2.5 micrometers, more preferably in the range of from 1.25 to 2 micrometers, or wherein the particles of the oxidic support comprised in said aqueous suspension exhibit a polymodal particle size distribution, more preferably a bi-modal particle size distribution, characterized by a particle size distribution curve determined according to Reference Example 1 herein;

(iii) mixing the suspension obtained from (ii), optionally with the suspension obtained from (i), obtaining an aqueous suspension comprising water, a source of one or more of a vanadium oxide and a tungsten oxide, particles of an oxidic support, and optionally particles of a mixed oxide comprising cerium, wherein the particles of the aqueous suspension exhibit a polymodal particle size distribution, characterized by a particle size distribution curve determined according to Reference Example 1 herein, said particle size distribution curve comprising a first peak with a maximum M(I) in the range of from 0.5 to 15 micrometers and a second peak with a maximum M(II) in the range of from 1 to 40 micrometers, wherein (M(I)/µm):(M(II)/µm)<1:1.

31. The process of embodiment 30, wherein the suspension obtained in (i) has a solid content in the range of from 20 to 50 weight-%, preferably in the range of from 25 to 45 weight-%, more preferably in the range of from 30 to 40 weight-%, based on the weight of said suspension.

32. The process of embodiment 30 or 31, wherein (i) further comprises adding an acid, the acid preferably being the acid as defined in embodiment 23.

33. The process of any one of embodiments 30 to 32, wherein (M2/µm)−(M1/µm)≥0.5, preferably 0.5≤(M2/µm)−(M1/µm)≤30, more preferably 5≤(M2/µm)−(M1/µm)≤25, more preferably 10≤(M2/µm)−(M1/µm)≤23, more preferably 13≤(M2/µm)−(M1/µm)≤19.

34. The process of any one of embodiments 30 to 33, wherein the particle size distribution of the particles of the aqueous suspension obtained according to (i) is characterized by a particle size distribution curve determined according to Reference Example 1 herein, said particle size distribution curve comprising a first peak with a maximum M1 in the range of from 0.5 to 8 micrometers and a second peak with a maximum M2 in the range of from 9 to 50 micrometers.

35. The process of any one of embodiments 30 to 34, wherein according to (i), M1 is in the range of from 1.25 to 6 micrometers, preferably in the range of from 1.75 to 4 micrometers, more preferably in the range of from 1.85 to 3 micrometers; and M2 is in the range of from 9 to 35 micrometers, more preferably in the range of from 10 to 25 micrometers, more preferably 12 to 25 micrometers.

36. The process of any one of embodiments 30 to 35, wherein the particles of the suspension obtained according to (i) have a Dv10 in the range of from 0.2 to 8 micrometers, preferably in the range of from 0.45 to 5 micrometers, more preferably in the range of from 0.5 to 4 micrometers, more preferably in the range of from 0.6 to 2.5 micrometers, more preferably in the range of from 0.8 to 1.25 micrometers, the Dv10 being determined according to Reference Example 1 herein.

37. The process of any one of embodiments 30 to 36, wherein the particles of the suspension obtained according to (i) have a Dv50 in the range of from 1 to 25 micrometers, preferably in the range of from 1.5 to 10 micrometers, more preferably in the range of from 1.75 to 7 micrometers, more preferably in the range of from 2 to 4 micrometers, the Dv50 being determined according to Reference Example 1 herein.

38. The process of any one of embodiments 30 to 37, wherein the particles of the suspension obtained according to (i) have a Dv90 in the range of from 3 to 30 micrometers, preferably in the range of from 6 to 25 micrometers, more preferably in the range of from 8 to 20 micrometers, more preferably in the range of from 10 to 18 micrometers, more preferably in the range of from 12 to 16 micrometers, the Dv90 being determined according to Reference Example 1 herein.

39. The process of any one of embodiments 30 to 38, wherein preparing the aqueous suspension according to (i) comprises (i.1') providing particles of the mixed oxide comprising cerium, wherein the particles of the mixed oxide exhibit a monomodal particle size distribution characterized by a particle size distribution curve determined according to Reference Example 1 herein, said particle size distribution curve comprising a peak with a maximum in the range of from 5.5 to 40 micrometers, preferably in the range of from 6 to 20 micrometers, more preferably in the range of from 6.25 to 15 micrometers, more preferably in the range of from 6.5 to 10 micrometers, more preferably in the range of from 6.75 to 9 micrometers;

(i.2') preparing an aqueous suspension comprising suspending the particles provided in (i.1') in water.

40. The process of any one of embodiments 30 to 38, wherein preparing the aqueous suspension according to (i) comprises (i.1) providing particles of the mixed oxide comprising cerium, wherein the particles of the mixed oxide exhibit a polymodal particle size distribution, preferably a bi-modal particle size distribution, characterized by a particle size distribution curve determined according to Reference Example 1 herein, said particle size distribution curve comprising a first peak with a maximum M1' in the range of from 0.5 to 30 micrometers and a second peak with a maximum M2' in the range of from 1 to 60 micrometers, wherein (M1'/μm):(M2'/μm) <1:1;

(i.2) preparing an aqueous suspension comprising suspending the particles provided in (i.1) in water;

(i.3) optionally milling the aqueous suspension prepared in (i.2) until the particles of the aqueous suspension exhibit a polymodal particle size distribution, preferably a bi-modal particle size distribution, characterized by a particle size distribution curve determined according to Reference Example 1 herein, said particle size distribution curve comprising a first peak with a maximum M1 and a second peak with a maximum M2, wherein (M1/μm):(M2/μm)<1:1 and wherein (M2/μm) <(M2'/μm) and/or (M1/μm)<(M1'/μm).

41. The process of embodiment 40, wherein (M2'/μm)−(M1'/μm)≥0.5, preferably 0.5≤(M2'/μm)−(M1'/μm)≤30, more preferably 5≤(M2'/μm)−(M1'/μm)≤25, more preferably 10≤(M2'/μm)−(M1'/μm)≤23, more preferably 15 (M2'/μm)−(M1'/μm)≤20.

42. The process of embodiment 40 or 41, wherein the particle size distribution of the particles of the mixed oxide provided in (i.1) is characterized by a particle size distribution curve determined according to Reference Example 1 herein, said particle size distribution curve comprising a first peak with a maximum M1' in the range of from 0.5 to 7 micrometers and a second peak with a maximum M2' in the range of from 8 to 60 micrometers, the process comprising the milling according to (i.3).

43. The process of any one of embodiments 40 to 42, wherein the first peak of the particle size distribution curve of the particles of the mixed oxide provided in (i.1) has a maximum M1' in the range of from 1 to 5 micrometers, preferably in the range of from 1.5 to 4 micrometers, more preferably in the range of from 1.75 to 3 micrometers.

44. The process of any one of embodiments 40 to 43, wherein the second peak of the particle size distribution curve of the particles of the mixed oxide provided in (i.1) has a maximum M2' in the range of from 10 to 40 micrometers, preferably in the range of from 12 to 30 micrometers, more preferably 15 to 25 micrometers, the particle size distribution being determined according to Reference Example 1 herein.

45. The process of any one of embodiments 40 to 44, wherein the particles of the mixed oxide provided in (i.1) have a Dv10 in the range of from 0.2 to 10 micrometers, preferably in the range of from 0.5 to 7 micrometers, more preferably in the range of from 0.6 to 4 micrometers, more preferably in the range of from 0.75 to 3 micrometers, more preferably in the range of from 0.9 to 1.75 micrometers, the Dv10 being determined according to Reference Example 1 herein.

46. The process of any one of embodiments 40 to 45, wherein the particles of the mixed oxide provided in (i.1) have a Dv50 in the range of from 1 to 30 micrometers, preferably in the range of from 1.5 to 20 micrometers, more preferably in the range of from 1.75 to 10 micrometers, more preferably in the range of from 2 to 5 micrometers, the Dv50 being determined according to Reference Example 1 herein.

47. The process of any one of embodiments 40 to 46, wherein the particles of the mixed oxide provided in (i.1) have a Dv90 in the range of from 5 to 45 micrometers, preferably in the range of from 8 to 40 micrometers, more preferably in the range of from 12 to 30 micrometers, more preferably in the range of from 15 to 25 micrometers, the Dv90 being determined according to Reference Example 1 herein.

48. The process of embodiment 47, wherein the particles of the mixed oxide provided in (i.1) have a Dv90 in the range of from 17 to 24 micrometers, the Dv90 being determined according to Reference Example 1 herein.

49. The process of any one of embodiments 30 to 48, wherein the suspension obtained in (ii) has a solid content in the range of from 25 to 55 weight-%, preferably in the range of from 30 to 50 weight-%, more preferably in the range of from 35 to 45 weight-%, based on the weight of said suspension.

50. The process of any one of embodiments 30 to 49, wherein (ii) further comprises adding a dispersant, the dispersant preferably being as defined in embodiment 24.

51. The process of any one of embodiments 30 to 50, wherein the particles of the oxidic support in the suspension obtained according to (ii) have a Dv10 in the range of from 0.3 to 4 micrometers, preferably in the range of from 0.4 to 3 micrometers, more preferably in the range of from 0.5 to 2 micrometers, more preferably in the range of from 0.55 to 1 micrometer, more preferably in the range of from 0.6 to 0.8 micrometer, the Dv10 being determined according to Reference Example 1 herein.

52. The process of any one of embodiments 30 to 51, wherein the particles of the oxidic support in the suspension obtained according to (ii) have a Dv50 in the range of from 0.5 to 5 micrometers, preferably in the range of from 0.6 to 4 micrometers, more preferably in the range of from 0.7 to 2 micrometers, more preferably in the range of from 0.8 to 1.5 micrometers, the Dv50 being determined according to Reference Example 1 herein.

53. The process of any one of embodiments 30 to 52, wherein the particles of the oxidic support in the suspension according to (ii) have a Dv90 in the range of from 0.5 to 6 micrometers, preferably in the range of from 1 to 4 micrometers, more preferably in the range of from 1.5 to 3.5 micrometers, the Dv90 being determined according to Reference Example 1 herein.

54. The process of embodiment 53, wherein the particles of the oxidic support in the suspension obtained according to (ii) have a Dv90 in the range of from 2 to 3 micrometers, the Dv90 being determined according to Reference Example 1 herein.

55. The process of any one of embodiments 30 to 54, wherein the suspension obtained in (iii) has a solid content in the range of from 25 to 55 weight-%, preferably in the range of from 30 to 50 weight-%, more preferably in the range of from 35 to 45 weight-%, based on the weight of said suspension.

56. The process of any one of embodiments 30 to 55, wherein (iii) further comprises measuring the pH of the aqueous phase of the suspension and adjusting the pH to a value in the range of from 4 to 9, preferably in the range of from 5 to 8, more preferably in the range of from 6 to 7.

57. The process of any one of embodiments 30 to 56, wherein (iii) further comprises adding a source of an oxidic binder, the source of the oxidic binder preferably being the source of the oxidic binder as defined in embodiment 25.

58. The process of embodiment 57, wherein, after adding the source of the oxidic binder, the suspension in (iii) has a solid content in the range of from 25 to 55 weight-%, preferably in the range of from 30 to 50 weight-%, more preferably in the range of from 35 to 45 weight-%, based on the weight of said suspension.

59. The process of embodiment 57 or 58, wherein (iii), after adding the source of the oxidic binder, comprises measuring the pH of the aqueous phase of the obtained suspension and adjusting the pH to a value in the range of from 4 to 9, preferably in the range of from 5 to 8, more preferably in the range of from 6.5 to 7.5.

60. The process of any one of embodiments 30 to 59, consisting of (ii) and (iii), preferably of (i), (ii) and (iii).

61. A process for preparing a selective catalytic reduction catalyst, the process comprising
(a) preparing an aqueous suspension according to any one of embodiments 1 to 29, preferably according to a process according to any one of embodiments 30 to 60;
(b) disposing the suspension obtained in (a) on the surface of the internal walls of a substrate comprising an inlet end, an outlet end, a substrate axial length extending between the inlet end and the outlet end, and a plurality of passages defined by internal walls of the substrate extending therethrough, wherein the interface between the passages and the internal walls is defined by the surface of the internal walls; and optionally drying the substrate comprising the suspension disposed thereon;
(c) calcining the substrate obtained in (b).

62. The process of embodiment 61, wherein disposing the suspension according to (b) is performed by spraying the suspension onto the substrate or by immersing the substrate into the suspension, preferably by immersing the substrate into the suspension.

63. The process of embodiment 61 or 62, wherein the aqueous suspension obtained in (a) is disposed according to (b) over x % of the substrate axial length from the inlet end to the outlet end of the substrate, or from the outlet end to the inlet end of the substrate, wherein x is in the range of from 80 to 100, preferably in the range of from 90 to 100, more preferably in the range of from 95 to 100, more preferably in the range of from 98 to 100.

64. The process of any one of embodiments 61 to 63, wherein the substrate in (b) is a flow-through substrate, preferably one or more of a cordierite flow-through substrate and a silicon carbide flow-through substrate, more preferably a cordierite flow-through substrate; or
wherein the substrate in (b) is a wall-flow substrate, preferably one or more of a cordierite wall-flow substrate and a silicon carbide wall-flow substrate, more preferably a cordierite wall-flow substrate;
wherein the substrate in (b) preferably is a flow-through substrate, more preferably a cordierite flow-through substrate;
wherein the internal walls of the flow-through substrate in (b) more preferably have an uncoated average porosity in the range of from 15 to 80%, more preferably in the range of from 25 to 75%, more preferably in the range of from 30 to 60%, wherein the average porosity is determined according to Reference Example 4.

65. The process of any one of embodiments 61 to 64, wherein drying in (b) is performed in a gas atmosphere having a temperature in the range of from 60 to 180° C., preferably in the range of from 90 to 150° C., the gas atmosphere preferably comprising oxygen, the gas atmosphere more preferably being air;
wherein drying in (b) preferably is performed for a duration in the range of from 5 minutes to 3 hours, more preferably in the range of from 10 minutes to 2 hours, more preferably in the range of from 20 minutes to 1 hour.

66. The process of any one of embodiments 61 to 65, wherein disposing according to (b) comprises
(b.1) disposing a first portion of the aqueous suspension obtained in (a) on the surface of the internal walls of a substrate comprising an inlet end, an outlet end, a substrate axial length extending between the inlet end and the outlet end, and a plurality of passages defined by internal walls of the substrate extending therethrough, wherein the interface between the passages and the internal walls is defined by the surface of the internal walls; and drying the substrate comprising the first portion of the suspension disposed thereon;
(b.2) disposing a second portion of the aqueous suspension obtained in (a) on the substrate comprising the first portion of the suspension disposed thereon obtained in (b.1), and optionally drying the substrate comprising the first and the second portions of the suspension disposed thereon.

67. The process of embodiment 66, wherein the first portion of the aqueous suspension obtained in (a) is disposed according to (b.1) over x1% of the substrate axial length from the inlet end to the outlet end of the substrate, or from the outlet end to the inlet end of the substrate, wherein x1 is in the range of from 80 to 100, preferably in the range of from 90 to 100, more preferably in the range of from 95 to 100, more preferably in the range of from 98 to 100.

68. The process of embodiment 66 or 67, wherein the second portion of the aqueous suspension obtained in (a) is disposed according to (b.2) over x2% of the substrate axial length from the inlet end to the outlet end of the substrate or from the outlet end to the inlet end of the substrate, wherein x2 is in the range of from 80 to 100, preferably in the range of from 90 to 100, more preferably in the range of from 95 to 100, more preferably in the range of from 98 to 100.

69. The process of embodiment 67 or 68, wherein the first portion of the aqueous suspension obtained in (a) is disposed according to (b.1) over x1% of the substrate axial length from the inlet end to the outlet end of the substrate and the second portion of the aqueous suspension obtained in (a) is disposed according to (b.2) over x2% of the substrate axial length from the outlet end to the inlet end of the substrate.

70. The process of any one of embodiments 66 to 69, wherein drying according to (b.1) is performed in a gas atmosphere having a temperature in the range of from 60 to 180° C., preferably in the range of from 90 to 150° C., the gas atmosphere preferably comprising oxygen, the gas atmosphere more preferably being air;
wherein drying according to (b.1) preferably is performed for a duration in the range of from 5 minutes to 3 hours, more preferably in the range of from 10 minutes to 2 hours, more preferably in the range of from 20 minutes to 1 hour.

71. The process of any one of embodiments 66 to 70, wherein (b.1) further comprises, after drying, calcining which is performed in a gas atmosphere having a temperature in the range of from 300 to 600° C., preferably in the range of from 350 to 550° C., more preferably in the range of from 400 to 500° C., the gas atmosphere preferably comprising oxygen, the gas atmosphere more preferably being air.

72. The process of any one of embodiments 66 to 71, wherein (b.1) further comprises, after drying, calcining which is performed in a gas atmosphere for a duration in the range of from 0.5 to 8 hours, preferably in the range of from 1 to 6 hours, more preferably in the range of from 3 to 5 hours, the gas atmosphere preferably comprising oxygen, the gas atmosphere more preferably being air.

73. The process of any one of embodiments 66 to 72, wherein drying according to (b.2) is performed in a gas atmosphere having a temperature in the range of from 60 to 180° C., preferably in the range of from 90 to 150° C., the gas atmosphere preferably comprising oxygen, the gas atmosphere more preferably being air;
  wherein drying according to (b.2) preferably is performed for a duration in the range of from 5 minutes to 3 hours, preferably in the range of from 10 minutes to 2 hours, more preferably in the range of from 20 minutes to 1 hour.

74. The process of any one of embodiments 61 to 73, wherein calcining according to (c) is performed in a gas atmosphere having a temperature in the range of from 300 to 600° C., preferably in the range of from 350 to 550° C., more preferably in the range of from 400 to 500° C., the gas atmosphere preferably comprising oxygen, the gas atmosphere more preferably being air.

75. The process of any one of embodiments 61 to 74, wherein calcining according to (c) is performed in a gas atmosphere for a duration in the range of from 0.5 to 8 hours, preferably in the range of from 1 to 6 hours, more preferably in the range of from 3 to 5 hours, the gas atmosphere preferably comprising oxygen, the gas atmosphere more preferably being air.

76. A selective catalytic reduction catalyst, preferably obtained or obtainable by a process according to any one of embodiments 61 to 75, the catalyst comprising:
  a substrate comprising an inlet end, an outlet end, a substrate axial length extending between the inlet end and the outlet end, and a plurality of passages defined by internal walls of the substrate extending therethrough, wherein the interface between the passages and the internal walls is defined by the surface of the internal walls;
  a coating disposed on the surface of the internal walls of the substrate, the coating comprising one or more of a vanadium oxide and a tungsten oxide supported on an oxidic support, and preferably a mixed oxide comprising cerium.

77. The catalyst of embodiment 76, wherein the coating comprises a vanadium oxide supported on the oxidic support, wherein the vanadium oxide is one or more of a vanadium (V) oxide, a vanadium (IV) oxide and a vanadium (III) oxide.

78. The catalyst of embodiment 76 or 77, wherein the coating comprises the vanadium oxide at an amount in the range of from 1.5 to 10 weight-%, preferably in the range of from 2.5 to 8 weight-%, more preferably in the range of from 3 to 5 weight-%, based on the weight of the oxidic support.

79. The catalyst of any one of embodiments 76 to 78, wherein the oxidic support comprises one or more of titanium, silicon, zirconium and tungsten, preferably one or more of titanium, silicon and tungsten, more preferably the oxidic support comprises titania;
  wherein the oxidic support more preferably comprises titania, and one or more of tungsten and silicon, more preferably tungsten or more preferably tungsten and silicon.

80. The catalyst of embodiment 79, wherein from 95 to 100 weight-%, preferably from 98 to 100 weight-%, more preferably from 99 to 100 weight-%, more preferably from 99.5 to 100 weight-%, of the oxidic support consist of titania, and preferably one or more of tungsten and silicon, more preferably tungsten or more preferably tungsten and silicon.

81. The catalyst of embodiment 80, wherein from 70 to 99 weight-%, preferably from 75 to 95 weight-%, more preferably from 80 to 90 weight-%, more preferably from 85 to 90 weight-%, of the oxidic support consist of titania;
  wherein from 0.5 to 15 weight-%, preferably from 3 to 15 weight-%, more preferably from 6 to 12 weight-%, of the oxidic support consist of tungsten, calculated as $WO_3$;
  wherein from 0.5 to 15 weight-%, preferably from 2 to 10 weight-%, more preferably from 4 to 8 weight-%, of the oxidic support consist silicon, calculated as $SiO_2$.

82. The catalyst of any one of embodiments 76 to 81, wherein the coating comprises the oxidic support at a loading in the catalyst in the range of from 1.5 to 10 g/in$^3$, preferably in the range of from 2 to 7 g/in$^3$, more preferably in the range of from 2.5 to 5 g/in$^3$, more preferably in the range of from 2.5 to 4.2 g/in$^3$.

83. The catalyst of any one of embodiments 76 to 82, wherein the coating of the catalyst comprises the mixed oxide comprising cerium, wherein the mixed oxide additionally comprises one or more of zirconium, niobium, molybdenum, lanthanum, yttrium, neodymium, praseodymium and hafnium, preferably one or more of zirconium, lanthanum, praseodymium, yttrium, and hafnium, more preferably one or more of zirconium, praseodymium, lanthanum and hafnium, wherein the mixed oxide more preferably additionally comprises zirconium, praseodymium, lanthanum and hafnium;
  wherein more preferably from 20 to 60 weight-%, more preferably from 30 to 50 weight-%, more preferably from 35 to 45 weight-%, of the mixed oxide consist of cerium, calculated as $CeO_2$, and wherein more preferably from 40 to 80 weight-%, more preferably from 50 to 70 weight-%, more preferably from 55 to 65 weight-%, of the mixed oxide consist of zirconium, praseodymium, lanthanum and hafnium, calculated respectively as $ZrO_2$, $Pr_6O_{11}$, $La_2O_3$ and $HfO_2$, wherein more preferably from 30 to 60 weight-%, more preferably from 40 to 55 weight-%, more preferably from 45 to 55 weight-% of the mixed oxide consist of zirconium, calculated as $ZrO_2$.

84. The catalyst of any one of embodiments 76 to 83, wherein from 95 to 100 weight-%, preferably from 98 to 100 weight-%, more preferably from 99 to 100 weight-%, more preferably from 99.5 to 100 weight-%, of the mixed oxide consist of cerium, oxygen, zirconium, praseodymium, lanthanum and hafnium.

85. The catalyst of any one of embodiments 76 to 84, wherein the coating comprises the mixed oxide at a loading in the catalyst in the range of from 0.4 to 2.5 g/in$^3$, preferably in the range of from 0.6 to 2 g/in$^3$, more preferably in the range of from 0.7 to 1.5 g/in$^3$.

86. The catalyst of any one of embodiments 76 to 85, wherein the coating comprises the mixed oxide at a loading l1, (I1), and the oxidic support at a loading l2, (I2), wherein the loading ratio of the mixed oxide relative to the oxidic support, (I1):(I2), is in the range of from 1:1 to 1:10, preferably in the range of from 1:1.5 to 1:8, more preferably in the range of from 1:2 to 1:7, more preferably in the range of from 1:2.5 to 1:5.

87. The catalyst of any one of embodiments 76 to 86, wherein the coating further comprises an oxidic binder, wherein the oxidic binder preferably is selected from the group consisting of alumina, silica, zirconia, and mixture of two or more thereof, more preferably selected from the group consisting of alumina, silica and mixture of two or more thereof, more preferably silica.

88. The catalyst of embodiment 87, wherein the coating comprises the mixed oxide at a loading I1, (I1), and the oxidic binder at a loading I3, (I3), wherein the loading ratio of the mixed oxide to the oxidic binder, (I1):(I3), is in the range of from 3.5:1 to 15:1, preferably in the range of from 4:1 to 10:1, more preferably in the range of from 5:1 to 8:1.

89. The catalyst of embodiment 87 or 88, wherein the coating comprises the oxidic binder at a loading in the catalyst in the range of from 0.05 to 0.5 g/in$^3$, preferably in the range of from 0.07 to 0.3 g/in$^3$, more preferably in the range of from 0.08 to 0.25 g/in$^3$.

90. The catalyst of any one of embodiments 76 to 89, comprising the coating at a loading in the range of from 2.5 to 12 g/in$^3$, preferably in the range of from 3 to 8 g/in$^3$, more preferably in the range of from 3.5 to 6 g/in$^3$, more preferably in the range of from 4 to 5.5 g/in$^3$.

91. The catalyst of any one of embodiments 76 to 90, wherein from 0 to 0.1 weight-%, preferably from 0 to 0.01 weight-%, more preferably from 0 to 0.001 weight-%, of the coating consist of a zeolitic material, preferably of a molecular sieve.

92. The catalyst of any one of embodiments 76 to 91, wherein from 0 to 0.01 weight-%, preferably from 0 to 0.001 weight-%, more preferably from 0 to 0.0001 weight-%, of the coating consist of copper, preferably of copper and iron.

93. The catalyst of any one of embodiments 76 to 92, wherein from 0 to 0.01 weight-%, preferably from 0 to 0.001 weight-%, more preferably from 0 to 0.0001 weight-%, of the coating consist of platinum, preferably of platinum and palladium, more preferably of platinum, palladium and rhodium, more preferably of platinum group metals.

94. The catalyst of any one of embodiments 76 to 93, wherein from 95 to 100 weight, preferably from 98 to 100 weight-%, more preferably from 99 to 100 weight-%, more preferably from 99.5 to 100 weight-%, of the coating consist of one or more of a vanadium oxide and a tungsten oxide supported on an oxidic support, and preferably a mixed oxide comprising cerium, and more preferably an oxidic binder as defined in any one of embodiments 87 to 89.

95. The catalyst of any one of embodiments 76 to 94, wherein the coating extends over x % of the substrate axial length on the surface of the internal walls from the inlet end to the outlet end or from the outlet end to the inlet end, x being in the range of from 90 to 100, preferably in the range of from 95 to 100, more preferably in the range of from 98 to 100.

96. The catalyst of any one of embodiments 76 to 95, wherein the substrate is a flow-through substrate, preferably one or more of a cordierite flow-through substrate and a silicon carbide flow-through substrate, more preferably a cordierite flow-through substrate; or
wherein the substrate is a wall-flow substrate, preferably one or more of a cordierite wall-flow substrate and a silicon carbide wall-flow substrate, more preferably a cordierite wall-flow substrate;
wherein the substrate more preferably is a flow-through substrate, more preferably a cordierite flow-through substrate.

97. The catalyst of any one of embodiments 76 to 96, consisting of the substrate and the coating.

98. Use of a selective catalytic reduction catalyst according to any one of embodiments 76 to 97 for the selective catalytic reduction of nitrogen oxides.

99. Use of an aqueous suspension according to any one of embodiments 1 to 29 for preparing a selective catalytic reduction catalyst.

100. A method for the selective catalytic reduction of nitrogen oxides, the method comprises
(1) providing an exhaust gas stream from a diesel engine comprising NOx;
(2) passing the exhaust gas stream provided in (1) through the selective catalyst reduction catalyst according to any one of embodiments 76 to 97.

101. A method for improving the adhesion of a catalytic coating to a substrate in a catalyst, the method comprising using an aqueous suspension according to any one of embodiments 1 to 29 for preparing the catalyst.

In the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Further, in the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Furthermore, in the context of the present invention, the term "consists of" with regard to the weight-% of one or more components indicates the weight-% amount of said component(s) based on 100 weight-% of the entity in question. For example, the wording "wherein from 0 to 0.001 weight-% of the coating consists of platinum" indicates that among the 100 weight-% of the components of which said coating consists of, 0 to 0.001 weight-% is platinum.

The present invention is further illustrated by the following Reference Examples, Comparative Examples, and Examples.

EXAMPLES

Reference Example 1 Determination of the Particle Size Distribution, Dv10, Dv50, Dv90 Values The particle size distributions were determined by a static light scattering method using Sympatec HELOS equipment, wherein the optical concentration of the sample was in the range of from 5 to 10%.

Reference Example 2 Measurement of the BET Specific Surface Area

The BET specific surface area was determined according to DIN 66131 or DIN ISO 9277 using liquid nitrogen.

Reference Example 3 General Coating Method

In order to coat a flow-through substrate with one or more coatings, the flow-through substrate was immersed vertically in a portion of a given slurry for a specific length of the substrate. In this manner, the washcoat contacted the walls of the substrate. The sample was left in the slurry for a specific period of time, usually for 1-10 seconds. Vacuum was applied to draw the slurry into the substrate. The substrate was then removed from the slurry, and was inverted and excess slurry was removed from the substrate by allowing it to drain from the substrate, then by blowing with compressed air (against the direction of slurry penetration).

Reference Example 4 Determination of the Average Porosity of an Uncoated Substrate The average porosity of the porous wall-flow substrate was determined by mercury intrusion using mercury porosimetry according to DIN 66133 and ISO 15901-1.

Example 1.1 Vanadium-Based SCR Catalyst not According to the Present Invention (with a Bi-Modal Particle Size Distribution Oxidic Support)

An aqueous vanadium oxalate solution (which upon removal of all solvents leads to 11 weight-% of vanadium oxide in water based on the weight of the solution) was diluted in distilled water such that the final solute mass percentage of the solution was 3 weight-%. The amount of vanadium oxalate used was calculated such that the vanadium oxide, calculated as $V_2O_5$, was present at a loading of 2.5% of the final coating loading in the catalyst after calcination. To this diluted vanadium oxalate mixture, a titania powder ($TiO_2$ 90 weight-% and 10 weight-% of $WO_3$ with a BET specific surface area of about 90 m$^2$/g, a Dv10 of about 0.4 micrometers, a Dv50 of about 1 micrometer, a Dv90 of about 2.5 micrometers and a Dv99 of about 15.3 micrometers, and a bi-modal particle size distribution characterized by a particle size distribution curve determined according to Reference Example 1 herein, said particle size distribution curve comprising a first peak with a maximum at about 1.25 micrometers and a second peak with a maximum at about 14 micrometers) was added. Further, an organic dispersant (acrylic polymer) solution—with a pH of 8—whereby 39 weight-% of the weight of the solution is the acrylic polymer was added to the suspension. The amount of the dispersant mixture was calculated such that it was 5% by weight of the total weight of the titania+tungsten oxide in the catalyst after calcination. The resulting suspension was stirred for several minutes and the pH was adjusted to about 5.5 by adding an ammonium-hydroxide solution. Further, distilled water was added in order to obtain a suspension with a solid content to 45.3 weight-%.

Afterwards, an aqueous colloidal silica (with a solid content of 40 weight-%) was added to the obtained suspension, in an amount such that the final $SiO_2$ loading in the catalyst after calcination was 0.21 g/in$^3$, along with additional distilled water to obtain a final suspension solid content of 45 weight-%. The particles of the suspension exhibited a bi-modal particle size distribution characterized by a particle size distribution curve determined according to Reference Example 1 herein, said particle size distribution curve comprising a first peak with a maximum at about 1.25 micrometers and a second peak with a maximum at about 14 micrometers. The particle size distribution curve of the particles of said suspension is displayed in FIG. 1.

An uncoated honeycomb flow-through cordierite monolith substrate (an average porosity of 35%, diameter: 26.67 cm (10.5 inches)×length: 15.24 cm (6 inches) cylindrically shaped substrate with 400/(2.54)$^2$ cells per square centimeter and 0.10 millimeter (4 mil) wall thickness) was coated with the obtained suspension from the inlet end toward the outlet end of the substrate, over 100% of the length of the substrate according to the method described in Reference Example 3. The coated substrate was dried in stages between 110° C. and 130° C. for 30 minutes in total (to remove up to 80% of the water) and calcined in air for 4 hours, of which approximately 30 minutes were at 450° C. The coated substrate was coated a second time with said suspension from the outlet end toward the inlet end of the substrate over the 100% of the length of the substrate, then dried in stages between 110° C. and 130° C. for 30 minutes in total (to remove up to 80% of the water) and calcined in air for 4 hours, of which approximately 30 minutes were at 450° C. The final loading of the coating in the catalyst after calcination was 4.5 g/in$^3$, including 4.18 g/in$^3$ of titania+$WO_3$, 0.11 g/in$^3$ of vanadium (calculated as $V_2O_5$) and 0.21 g/in$^3$ of $SiO_2$.

Comparative Example 1 Vanadium-Based SCR Catalyst not According to the Present Invention (with No Bi-Modal Particle Size Distribution Component)

An aqueous vanadium oxalate solution (which upon removal of all solvents leads to 11 weight-% of vanadium oxide in water based on the weight of the solution) was diluted in distilled water such that such that the final solution upon calcination leads to 3.1 weight-% of vanadium oxide in water based on the weight of the solution. The amount of vanadium oxalate used was calculated such that the vanadium oxide, calculated as $V_2O_5$, was present at a loading of 4% of the final coating loading in the catalyst after calcination. An acrylic based organic dispersant (acrylic polymer) solution, having a pH of 8, whereby 39 weight-% of the weight of the solution is the acrylic polymer was added to form a mixture. The amount of dispersant mixture was calculated such that it was 5 weight-% of the total weight of the coating in the catalyst after calcination.

A titania powder ($TiO_2$ 87 weight-% with 8 weight-% of $WO_3$ and 5 weight-% of $SiO_2$ with a BET specific surface area of about 85 m$^2$/g, a Dv10 of 0.7 micrometers, a Dv50 of 1.3 micrometers, a Dv90 of 2.5 micrometers and a Dv99 of about 5 micrometers) was added to the obtained mixture, forming a suspension. The final loading of titania+tungsten oxide+silica in the catalyst after calcination was 4.11 g/in$^3$. The pH of the suspension was adjusted to about 7.0. Additional distilled water was added to bring the solid content of the suspension to 40.6 weight-%. A second organic-based dispersant (organic polymer) mixture was added to the suspension, this one having a solid content of 31 weight-%. This second dispersant mixture was added in the amount of 1 weight-% of the final coating loading in the catalyst.

Lastly, an aqueous colloidal silica (a solid content of 40 weight-%) was added to the suspension along with additional distilled water to obtain a final suspension with a solid content of 39 weight-%. The amount of colloidal silica used was calculated such that the final $SiO_2$ loading (from the colloidal silica) was 5% of the final loading of titania+tungsten oxide+silica in the catalyst after calcination. The particles of the suspension exhibited a monomodal particle size distribution characterized by a particle size distribution curve determined according to Reference Example 1 herein, said particle size distribution curve comprising a peak with a maximum at about 1.7 micrometers. The particle size distribution of the particles of said final suspension is displayed in FIG. 2. The pH of the suspension was measured and adjusted to about 7.

An uncoated honeycomb flow-through cordierite monolith substrate (an average porosity of 35%, diameter: 26.67 cm (10.5 inches)×length: 15.24 cm (6 inches) cylindrically shaped substrate with $400/(2.54)^2$ cells per square centimeter and 0.10 millimeter (4 mil) wall thickness) was coated with the final suspension from the inlet end toward the outlet end of the substrate, over 100% of the length of the substrate according to the method described in Reference Example 3. The coated substrate was dried in stages between 110° C. and 130° C. for 30 minutes in total (to remove up to 80% of the water) and calcined in air for 4 hours, of which approximately 30 minutes were at 450° C. The coated substrate was coated a second time with said suspension from the outlet end toward the inlet end of the substrate over the 100% of the length of the substrate, then dried in stages between 110° C. and 130° C. for 30 minutes in total (to remove up to 80% of the water) and calcined in air for 4 hours, of which approximately 30 minutes were at 450° C. The final loading of the coating in the catalyst after calcination was 4.5 g/in$^3$, including 4.11 g/in$^3$ of titania+tungsten oxide+silica, 0.18 g/in$^3$ of vanadium (calculated as $V_2O_5$), 0.21 g/in$^3$ of $SiO_2$ (from the colloidal silica).

Example 1.2 Vanadium-Based SCR Catalyst (with a Bi-Modal Particle Size Distribution Mixed Oxide)

A powder of a mixed oxide of Ce and Zr (40 weight-% of Ce, calculated as $CeO_2$, 50 weight-% of Zr (~49 weight-%) and Hf, calculated as $ZrO_2$ and $HfO_2$ respectively, 5 weight-% of $La_2O_3$, and 5 weight-% of $Pr_6O_{11}$, having a BET specific area of about 80 m$^2$/g, a Dv10 of about 1 micrometers, a Dv50 of about 4 micrometers, a Dv90 of about 21 micrometers and a Dv99 of about 37 micrometers and a bi-modal particle size distribution characterized by a particle size distribution curve determined according to Reference Example 1 herein, said particle size distribution curve comprising a first peak with a maximum at about 2.25 micrometers and a second peak with a maximum at 20 micrometers as displayed in FIG. 3) is added to distilled water and tartaric acid (1 g of tartaric acid every 4000 g of the mixed oxide). The resulting suspension was milled using a continuous milling apparatus so that the Dv10 of the particles of said suspension was of 0.98 micrometer, the Dv50 of the particles of said suspension was of 3.06 micrometers, the Dv90 of the particles of said suspension was of 13.61 micrometers, and the Dv99 of the particles of said suspension was of 27.34 micrometers. The resulting suspension exhibited a bi-modal particle size distribution characterized by a particle size distribution curve determined according to Reference Example 1 herein, said particle size distribution curve comprising a first peak with a maximum at about 2.25 micrometers and a second peak with a maximum at about 15 micrometers as displayed in FIG. 4. The amount of the mixed oxide of Ce and Zr was calculated such that its loading in the catalyst was of 1 g/in$^3$. The solid content of the obtained suspension was of 35 weight-%.

Separately, an aqueous vanadium oxalate solution (which upon removal of all solvents leads to 11 weight-% of vanadium oxide in water based on the weight of the solution) was diluted in distilled water such that the final solution upon calcination leads to 3.3 weight-% of vanadium oxide in water based on the weight of the solution. The amount of vanadium oxalate used was calculated such that the vanadium oxide, calculated as $V_2O_5$, was present at a loading of 4.5% of the loading of titania+tungsten oxide+silica in the catalyst after calcination. An acrylic based organic dispersant (acrylic polymer) solution, having a pH of 8, whereby 39 weight-% of the weight of the solution is the acrylic polymer was added to the vanadium-containing solution. The amount of dispersant mixture was calculated such that it was 5 weight-% of the total weight of the coating in the catalyst after calcination. A titania powder ($TiO_2$ 87 weight-% with 8 weight-% of $WO_3$ and 5 weight-% of $SiO_2$ with a BET specific surface area of about 85 m$^2$/g, a Dv10 of about 0.7 micrometers, a Dv50 of about 1.3 micrometers, a Dv90 of about 2.5 micrometers and a Dv99 of about 4.8 micrometers) was added to the obtained mixture, forming a suspension. The final loading of titania+tungsten oxide+silica in the catalyst after calcination was 3.2 g/in$^3$. The obtained suspension had a solid content of about 42.3 weight-%.

The Ce—Zr containing suspension and the vanadium and titania containing suspension were admixed and stirred with a stirring impeller. The pH of the obtained suspension was measured and adjusted to about 6.5. Additional distilled water was added to bring the solid content of the suspension to 40 weight-%. The viscosity of the suspension was between 50 and 100 mPa*s at 300 rotations per second. Lastly, an aqueous colloidal silica (a solid content of 40 weight-%) was added to the suspension along with additional distilled water to obtain a final suspension with a solid content of 40 weight-%. The amount of colloidal silica used was calculated such that the final $SiO_2$ loading (from the colloidal silica) was 5% of the final loading of titania+tungsten oxide+silica in the catalyst after calcination. The particle size distribution of the particles of said suspension is displayed in FIG. 5. The particles of the suspension exhibited a bi-modal particle size distribution characterized by a particle size distribution curve determined according to Reference Example 1 herein, said particle size distribution curve comprising a first peak with a maximum at about 1.75 micrometers and a second peak with a maximum at about 8 micrometers. The pH of the suspension was measured and adjusted to about 7.

An uncoated honeycomb flow-through cordierite monolith substrate (an average porosity of 35%, diameter: 26.67 cm (10.5 inches)×length: 15.24 cm (6 inches) cylindrically shaped substrate with $400/(2.54)^2$ cells per square centimeter and 0.10 millimeter (4 mil) wall thickness) was coated with the final suspension from the inlet end toward the outlet end of the substrate, over 100% of the length of the substrate according to the method described in Reference Example 3. The coated substrate was dried in stages between 110° C. and 130° C. for 30 minutes in total (to remove up to 80% of the water) and calcined in air for 4 hours, of which approximately 30 minutes were at 450° C. The coated substrate was coated a second time with said suspension from the outlet end toward the inlet end of the substrate over the 100% of the length of the substrate, then dried in stages between 110° C. and 130° C. for 30 minutes in total (to remove up to 80% of the water) and calcined in air for 4 hours, of which approximately 30 minutes were at 450° C. The final loading of the coating in the catalyst after calcination was 4.5 g/in$^3$, including 3.2 g/in$^3$ of titania+$WO_3$+$SiO_2$, 0.14 g/in$^3$ of vanadium (calculated as $V_2O_5$), 1 g/in$^3$ of Ce/Zr mixed oxide, 0.16 g/in$^3$ of $SiO_2$ (from the colloidal silica).

Example 2 Washcoat Adhesion Test

A core was drilled-out from each of the catalysts (coated substrates) obtained in Comparative Example 1, Examples 1.1 and 1.2. Each of the cores had a length of 3 inches and a diameter of 1 inch. The three obtained cores were weighed. The core of each samples of Comparative Example 1, Examples 1.1 and 1.2 was exposed to a high pressure air treatment (2 bar), such that air was uniformly forced through the core. After the air stream was stopped the cores were again weighed. The weight was compared before and after the same high pressure air treatment. The results for each three cores are displayed in FIG. 6

As may be taken from FIG. 6, the coating of the catalyst of Example 1.1 and the coating of the catalyst of Example 1.2 according to the present invention exhibit a washcoat loss of less than 1.5% which shows a good washcoat adhesion while the coating of the catalyst of Comparative Example 1 exhibits an increased washcoat loss of about 18%. Without wanting to be bound to any theory, it is believed that it is due to the presence of a bi-modal particle size distribution in the suspension of Examples 1.1 and 1.2 of the present invention used for coating. The difference between the coating of the catalyst of Example 1.2 and the coating of the catalyst of Comparative Example 1 is the presence of a Ce/Zr mixed oxide having a bi-modal particle size distribution.

Thus, the presence of this particular mixed oxide in the suspension for coating permits to greatly improve the washcoat adhesion on a substrate. Further, the difference between the coating of the catalyst of Example 1.2 and the coating of the catalyst of Example 1.1 is the type of titania support and the presence of a bi-modal Ce-containing mixed oxide. In particular, in the coating of Example 1.1, the titania support is a titania support with a bi-modal particle size distribution while the support used in Example 1.2 has a monomodal particle size distribution.

Thus, it is demonstrated that only the presence of a bi-modal particle size distribution Ce-containing mixed oxide (binder) can also permit to obtain similar washcoat adhesion compared to a coating comprising a bi-modal particle size distribution oxidic support which is present in much higher proportions. Thus, Example 2 demonstrates that the use of a bi-modal particle size distribution in a suspension prior to coating permits to greatly increase the washcoat adhesion.

Example 3.1 Vanadium-Based SCR Catalyst not According to the Present Invention (with a Bi-Modal Particle Size Distribution Oxidic Support)

The catalyst of Example 3.1 was prepared as the catalyst of Example 1.1 except that the monolith substrate was an uncoated honeycomb flow-through cordierite monolith substrate (diameter: 33.02 cm (13 inches)×length: 15.24 cm (6 inches) cylindrically shaped substrate with $400/(2.54)^2$ cells per square centimeter and 0.10 millimeter (4 mil) wall thickness).

Example 3.2 Vanadium-Based SCR Catalyst (with a Bi-Modal Particle Size Distribution Ce-Containing Mixed Oxide)

The catalyst of Example 3.2 was prepared as the catalyst of Example 1.2 except that the monolith substrate was an uncoated honeycomb flow-through cordierite monolith substrate (diameter: 33.02 cm (13 inches)×length: 15.24 cm (6 inches) cylindrically shaped substrate with $400/(2.54)^2$ cells per square centimeter and 0.10 millimeter (4 mil) wall thickness).

Example 4 Performance Evaluation—DeNOx

The SCR catalysts of Example 3.1 and 3.2 were tested on a 13 L motor. To do so, 3 diesel oxidation catalysts (DOC), each DOC was 12 inches×6 inches with 20 g/ft$^3$ Pt, were mounted upstream of two SCR catalysts of Example 3.2 to achieve 80% $NO_2$/NOx at the SCR inlet. Said two SCR catalysts were mounted in series downstream of the DOCs and a urea injector. An SCR-inlet temperature of 270° C. was achieved. Once the system reached steady-state, urea was dosed at increasing stoichiometric ratios until again steady-state was achieved. Same was done with SCR catalyst prepared according to Example 3.2. The results are displayed on FIG. 7.

As may be taken from FIG. 7, the results show that the reference plateaus in performance even before stoichiometric ratio of 100% is reached (although it does respond more quickly than the Ce/Zr variant). The advantage of using the Ce/Zr mixed is that, with heavy urea overdosing, ultimately a higher conversion than the reference at ultra-high $NO_2$ concentrations is obtained.

CITED LITERATURE

US 2015/0005158 A1

Figure 1:
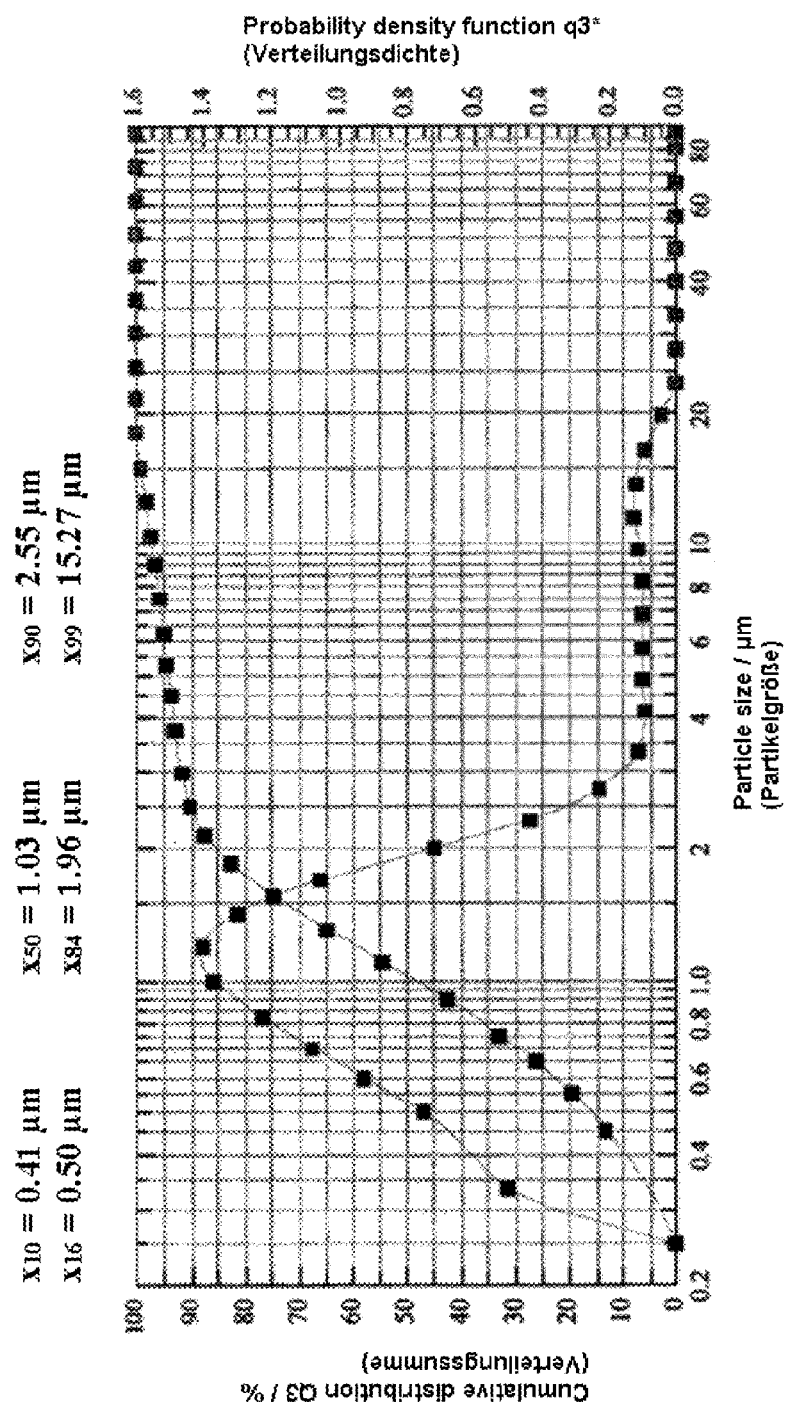
FIG. 1 shows the particle size distribution of the final suspension prepared in Example 1.1.
Figure 2:
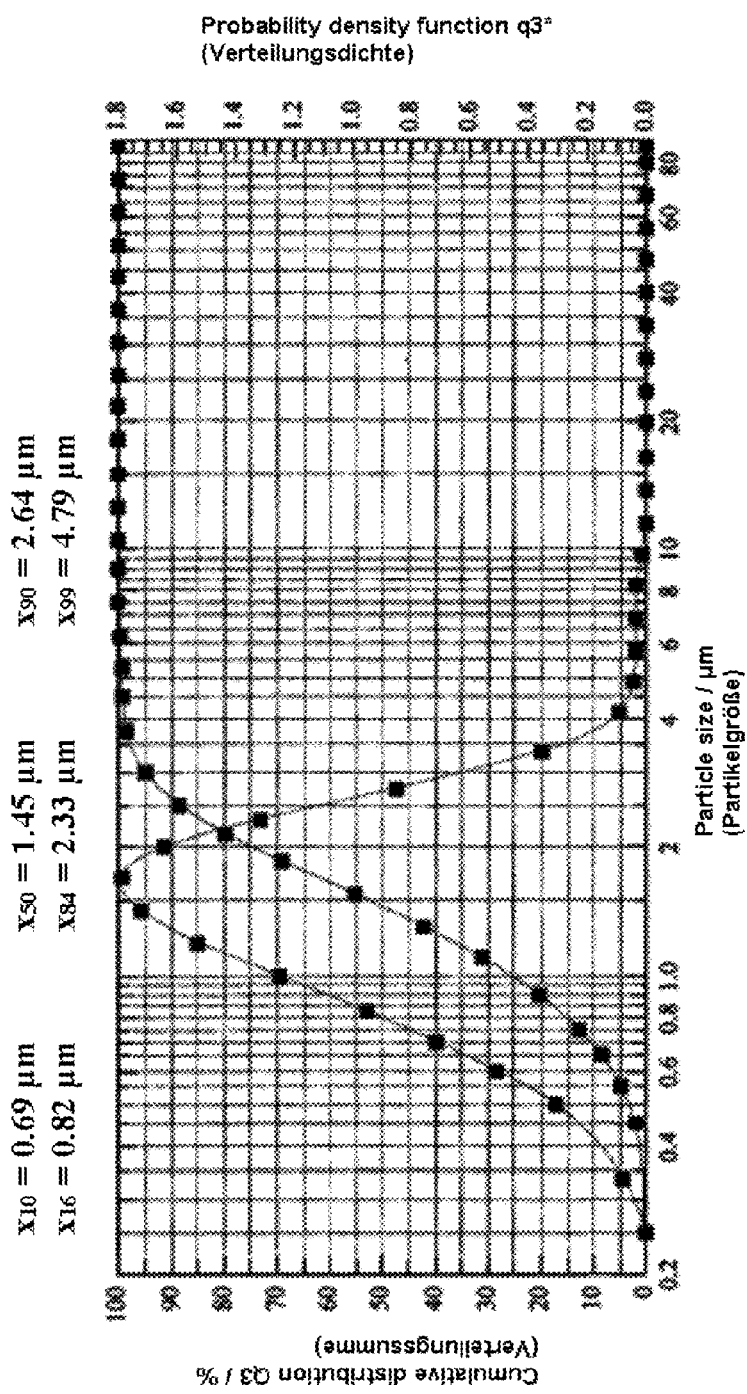
FIG. 2 shows the particle size distribution of the final suspension prepared in Comparative Example 1.
Figure 3:
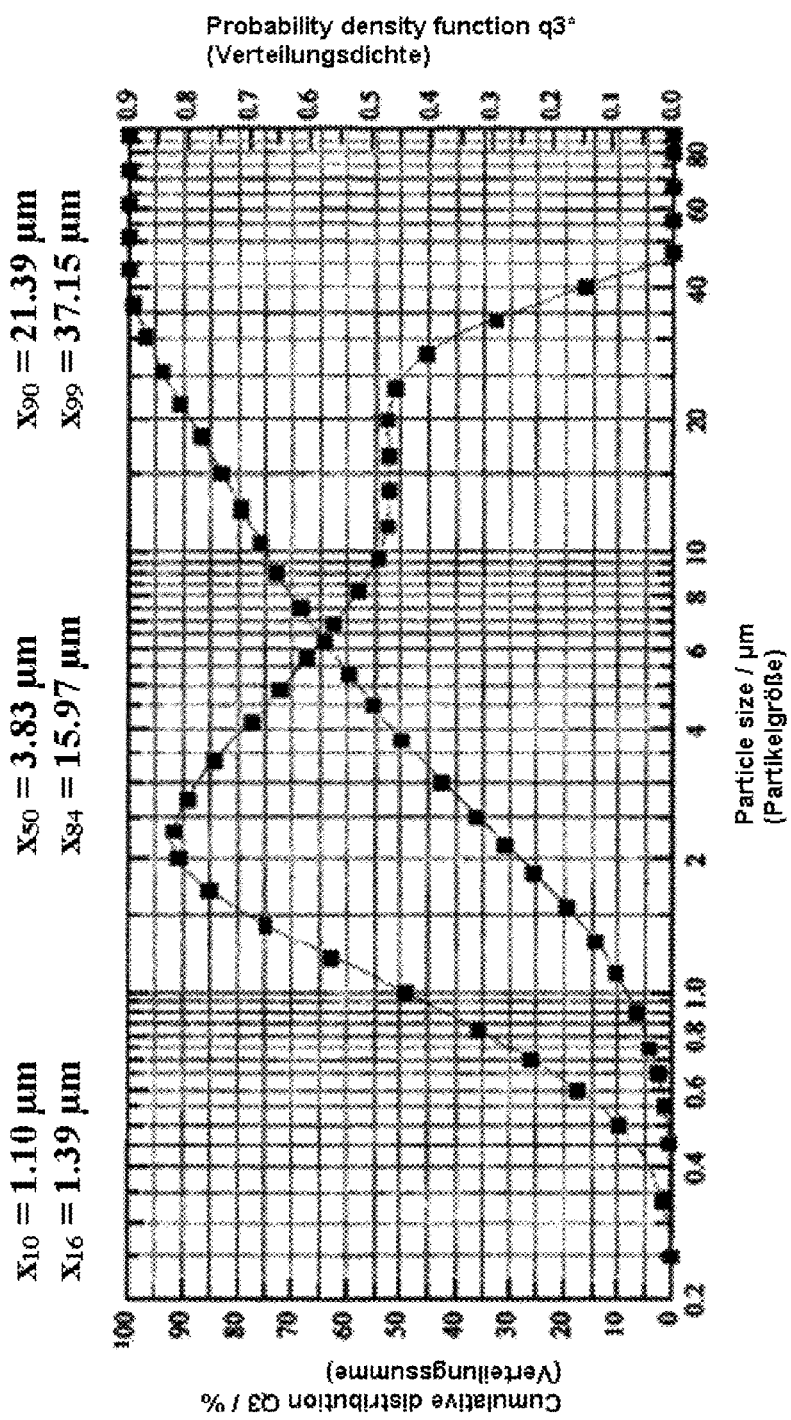
FIG. 3 shows the particle size distribution of the Ce/Zr mixed oxide used for preparing Example 1.2.
Figure 4:
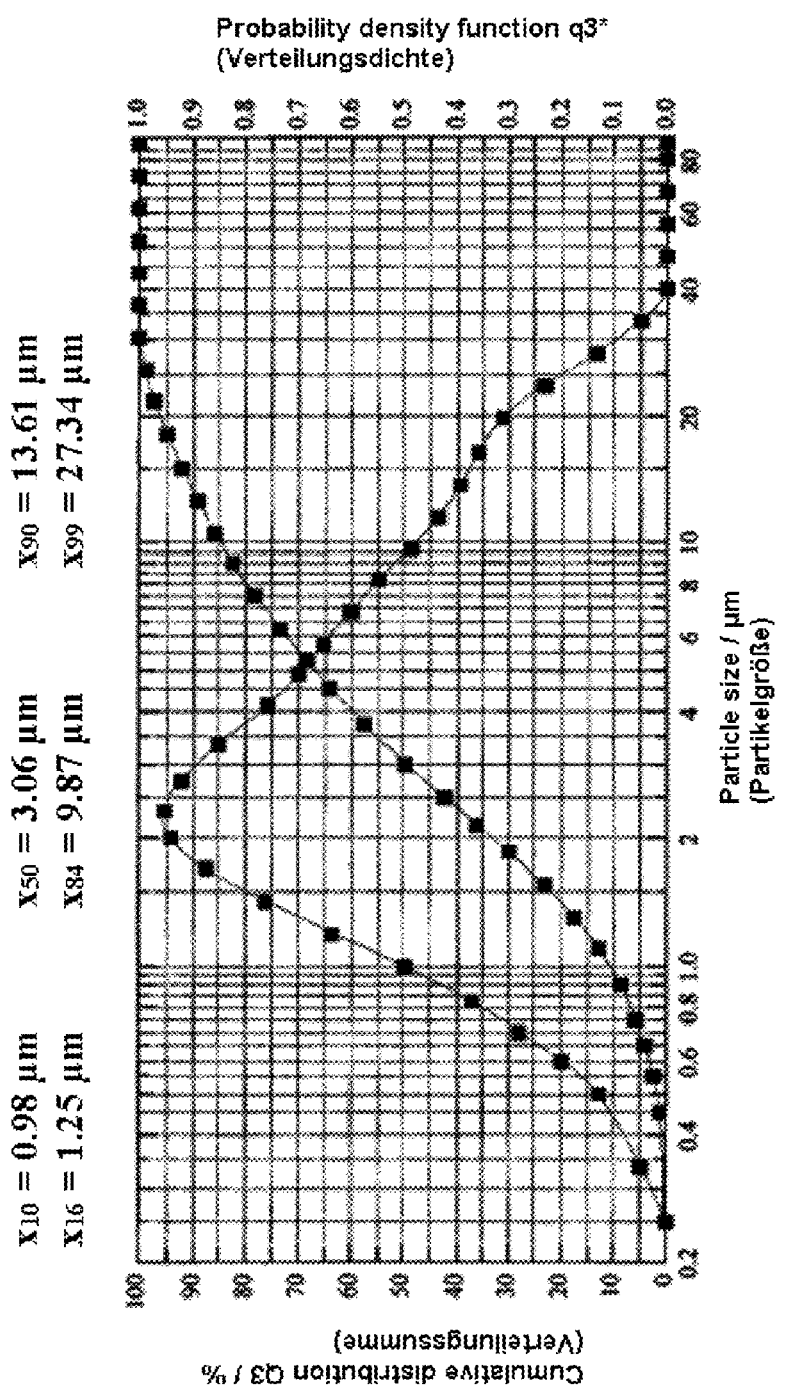
FIG. 4 shows the particle size distribution of the suspension comprising the Ce/Zr mixed oxide after milling in Example 1.2.
Figure 5:
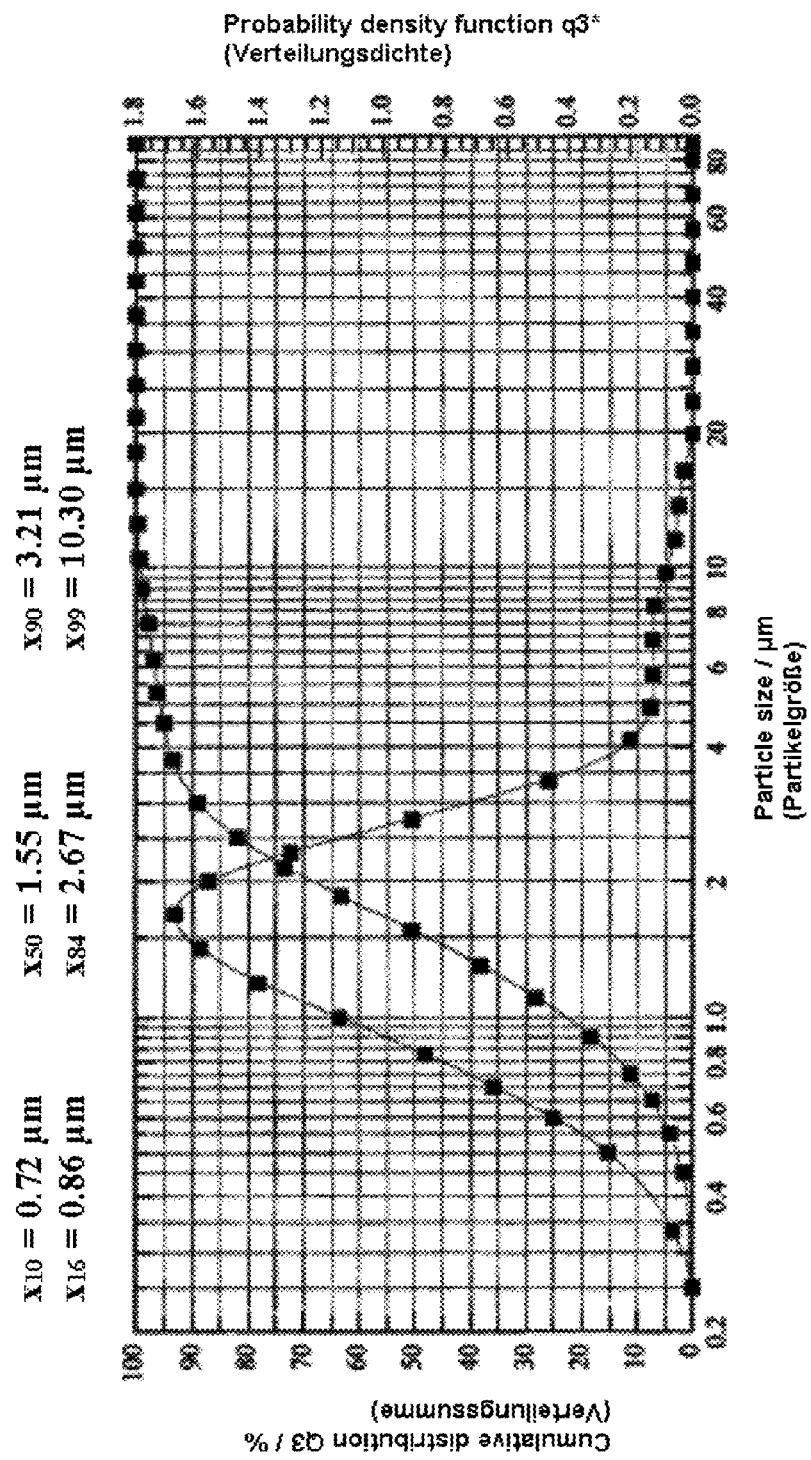
FIG. 5 shows the particle size distribution of the final suspension prepared in Example 1.2.
Figure 6:
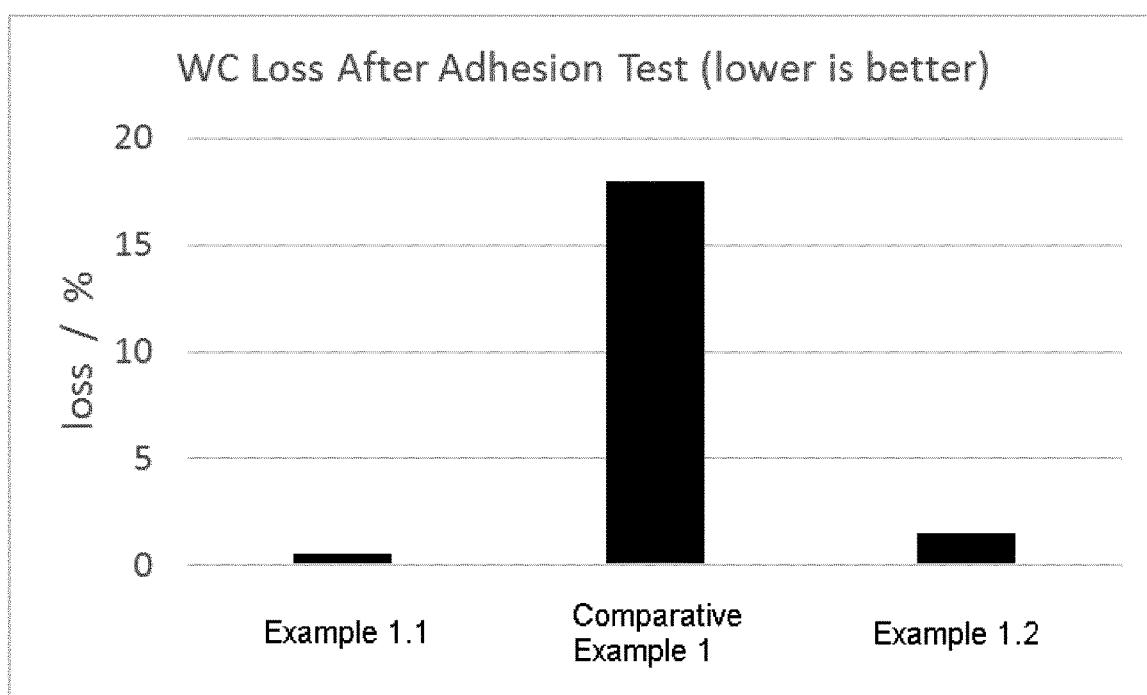
FIG. 6 shows the washcoat loss measured for the coatings of the catalysts of Comparative Example 1 and Examples 1.1 and 1.2.
Figure 7:
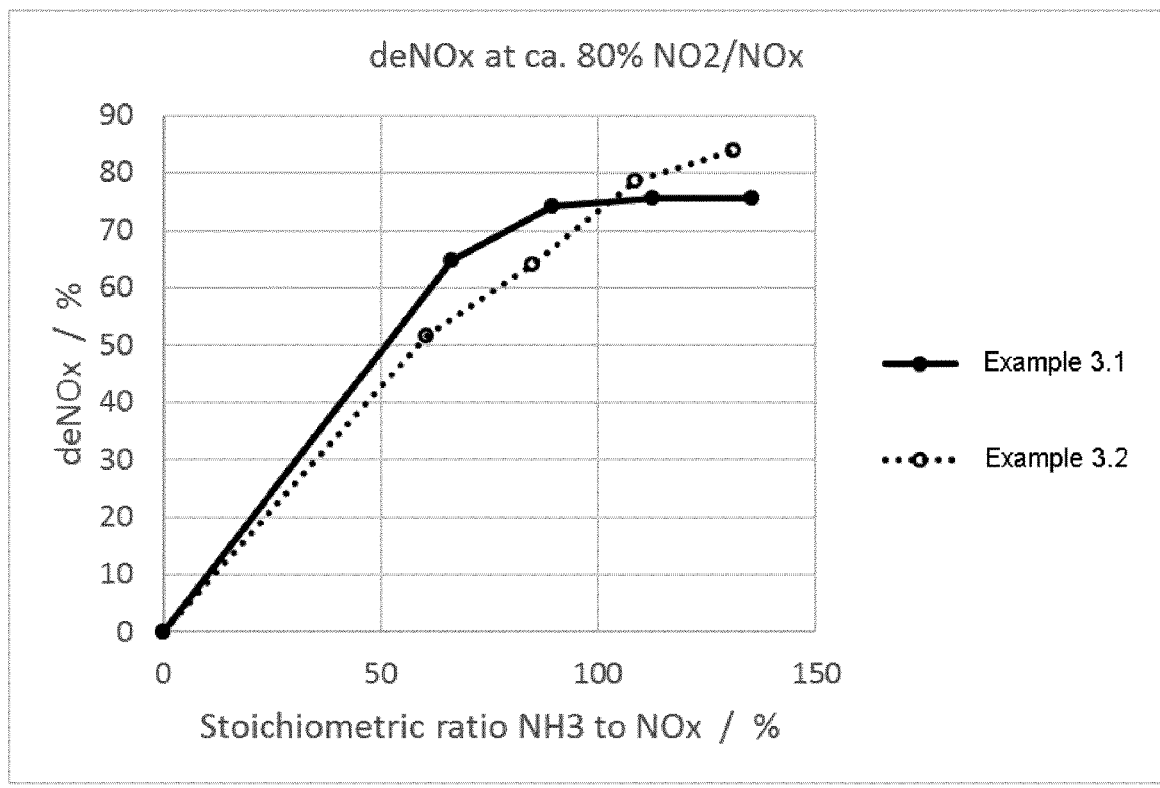
FIG. 7 shows the DeNOx performance of the catalyst of Examples 3.1 and 3.2 measured at high $NO_2$/NOx ratio at an SCR-inlet temperature of 270° C.

The invention claimed is:
1. An aqueous suspension comprising:
water, a source of one or more of a vanadium oxide and a tungsten oxide, and particles of an oxidic support;
wherein the particles of the aqueous suspension exhibit a polymodal particle size distribution having a particle size distribution curve comprising a first peak with a maximum, M(I), ranging from 0.5 micrometer to 15 micrometers and a second peak with a maximum, M(II), ranging from 1 micrometer to 40 micrometers, wherein M(I):M(II) is less than 1:1.

2. The suspension of claim 1, wherein the particles of the aqueous suspension exhibit a bimodal particle size distribution.

3. The suspension of claim 1, further comprising particles of a mixed oxide comprising cerium.

4. The suspension of claim 3, wherein the particles of the mixed oxide exhibit a monomodal particle size distribution or a polymodal particle size distribution.

5. The suspension of claim 1, wherein M(II)-M(I) is greater than or equal to 0.5.

6. The suspension of claim 1, wherein M(I) ranges from 0.5 micrometer to 5 micrometers; wherein M(II) ranges from 5.5 micrometers to 40 micrometers.

7. The suspension of claim 1, wherein the particles of the aqueous suspension have a Dv50 ranging from 0.2 micrometer to 10 micrometers.

8. The suspension of claim 1, wherein the aqueous suspension comprises a source of a vanadium oxide at an amount, calculated as $V_2O_5$, ranging from 1.5 weight-% to 8 weight-%, based on the weight of the oxidic support.

9. The suspension of claim 1, wherein the particles of the oxidic support exhibit a monomodal particle size distribution; or wherein the particles of the oxidic support exhibit a polymodal particle size distribution.

10. The suspension of claim 1, wherein the oxidic support comprises one or more of titanium, silicon, zirconium, and tungsten.

11. The suspension of claim 1, wherein the aqueous suspension further comprises a source of an oxidic binder.

12. A process for preparing the aqueous suspension according to claim 1, the process comprising:
   (i) optionally, preparing an aqueous suspension comprising water and particles of a mixed oxide comprising cerium, wherein the particles of the mixed oxide comprised in the aqueous suspension exhibit a monomodal particle size distribution; or
   optionally, preparing an aqueous suspension comprising water and particles of a mixed oxide comprising cerium, wherein the particles of the mixed oxide comprised in the aqueous suspension exhibit a polymodal particle size distribution having a particle size distribution curve comprising a first peak with a maximum M1 ranging from 0.5 micrometer to 20 micrometers and a second peak with a maximum M2 ranging from 1 micrometer to 50 micrometers, wherein M1:M2 is less than 1:1;
   (ii) preparing an aqueous suspension comprising water, a source of one or more of a vanadium oxide and a tungsten oxide and further comprising particles of an oxidic support, wherein the particles of the oxidic support comprised in the aqueous suspension exhibit a monomodal particle size distribution, having a particle size distribution curve comprising a peak with a maximum ranging from 0.5 micrometer to 5 micrometers, or wherein the particles of the oxidic support comprised in the aqueous suspension exhibit a polymodal particle size distribution;
   (iii) mixing the suspension obtained from (ii), optionally with the suspension obtained from (i), to obtain an aqueous suspension comprising water, a source of one or more of a vanadium oxide and a tungsten oxide, particles of an oxidic support, and optionally particles of a mixed oxide comprising cerium, wherein the particles of the aqueous suspension exhibit a polymodal particle size distribution, having a particle size distribution curve comprising a first peak with a maximum M(I) ranging from 0.5 micrometer to 15 micrometers and a second peak with a maximum M(II) ranging from 1 micrometer to 40 micrometers, wherein M(I):M(II) is less than 1:1.

13. The process of claim 12, wherein preparing the aqueous suspension according to (i) comprises:
   (i.1) providing particles of the mixed oxide comprising cerium, wherein the particles of the mixed oxide exhibit a polymodal particle size distribution having a particle size distribution curve comprising a first peak with a maximum M1' ranging from 0.5 micrometer to 30 micrometers and a second peak with a maximum M2' ranging from 1 micrometer to 60 micrometers, wherein M1':M2' is less than 1:1;
   (i.2) preparing an aqueous suspension comprising suspending the particles provided in (i.1) in water;
   (i.3) optionally, milling the aqueous suspension prepared in (i.2) until the particles of the aqueous suspension exhibit a polymodal particle size distribution having a particle size distribution curve comprising a first peak with a maximum M1 and a second peak with a maximum M2, wherein M1:M2 is less than 1:1 and wherein M2 is less than M2' and/or M1 is less than M1'.

14. The process of claim 13, wherein the particles of the mixed oxide provided in (i.1) have a Dv50 ranging from 1 micrometer to 30 micrometers.

15. A process for preparing a selective catalytic reduction catalyst, the process comprising:
   (a) preparing an aqueous suspension according to claim 1;
   (b) disposing the suspension obtained in (a) on the surface of the internal walls of a substrate comprising an inlet end, an outlet end, a substrate axial length extending between the inlet end and the outlet end, and a plurality of passages defined by internal walls of the substrate extending therethrough, wherein the interface between the passages and the internal walls is defined by the surface of the internal walls; and optionally drying the substrate comprising the suspension disposed thereon; and
   (c) calcining the substrate obtained in (b).

* * * * *